US006687238B1

(12) United States Patent
Soong et al.

(10) Patent No.: US 6,687,238 B1
(45) Date of Patent: Feb. 3, 2004

(54) CDMA SIGNAL TRANSMISSION CONTROL

(75) Inventors: Anthony C. K. Soong, Superior, CO (US); Lindsay A. Weaver, Jr., Boulder, CO (US); Brian K. Harms, Boulder, CO (US); Thomas J. Funk, Lafayette, CO (US); Larry D. Flowers, Broomfield, CO (US); Bruce S. Schwartz, Boulder, CO (US); Todd A. Pressley, Superior, CO (US); Robin Night, Loveland, CO (US)

(73) Assignee: Qualcomm Incorporated, San Diego, CA (US)

( * ) Notice: Subject to any disclaimer, the term of this patent is extended or adjusted under 35 U.S.C. 154(b) by 0 days.

(21) Appl. No.: 09/265,204

(22) Filed: Mar. 10, 1999

(51) Int. Cl.$^7$ ............................................ H04B 7/216
(52) U.S. Cl. ................................... 370/335; 370/342
(58) Field of Search ................................ 370/320, 328, 370/335, 342, 441, 488, 497; 375/130, 140, 144, 295, 296, 297

(56) References Cited

U.S. PATENT DOCUMENTS

| 5,297,161 | A | * | 3/1994 | Ling | 375/200 |
| 5,412,686 | A | * | 5/1995 | Ling | 375/200 |
| 5,742,595 | A | * | 4/1998 | Bhagalia | 370/342 |
| 5,974,093 | A | * | 10/1999 | Lee | 375/297 |
| 5,978,362 | A | * | 11/1999 | Lee et al. | 370/315 |
| 6,035,008 | A | * | 3/2000 | Kim | 375/345 |
| 6,094,585 | A | * | 7/2000 | Dajer et al. | |
| 6,226,502 | B1 | * | 5/2001 | Chung | 455/118 |

FOREIGN PATENT DOCUMENTS

EP 0751630 6/1996 ........... H04B/1/707

OTHER PUBLICATIONS

Sevic, et al., "Simulation of Power Amplifier Adjacent–Channel Power Ratio for Digital Wireless Communication Systems", IEEE Vehicular Technology Conference, 1997, pps. 681–685.

Antonio, et al., "A Novel Adaptive Predistortion Technique for Power Amplifiers", IEEE Vehicular Technology Conference, 1999, pps. 1505–1509.

* cited by examiner

Primary Examiner—Kwang Bin Yao
(74) Attorney, Agent, or Firm—Russell B. Miller; Christopher Edwards

(57) ABSTRACT

The invention is a CDMA transmission control technology that includes various combinations of the following functionality: decresting, in-band to out-of-band ratio (RIO), power control, and spectral shaping. Decresting reduces peaks in the CDMA signal. RIO generates a ratio based on the signal strength of in-band versus out-of-band portions of the CDMA signal. Power control adjusts the gain of the CDMA signal based on quadrature signal calculations. Spectral shaping attenuates in-band portions of the CDMA signal adjacent to the corner frequencies. The CDMA transmission control technology can be implemented in a CDMA base station to extend range and capacity.

42 Claims, 20 Drawing Sheets

| RATIO # | SEGMENTS | POWER RATIO | MAX VALUE | EXCEED? | DIFF |
|---|---|---|---|---|---|
| 1 | $\frac{1881}{1882}$ | $\frac{A}{B}$ | H | NO | N |
| 2 | $\frac{1881}{1883}$ | $\frac{A}{C}$ | I | NO | O |
| 3 | $\frac{1881}{1884}$ | $\frac{A}{D}$ | J | NO | P |
| 4 | $\frac{1881}{1885}$ | $\frac{A}{E}$ | K | NO | Q |
| 5 | $\frac{1881}{1886}$ | $\frac{A}{F}$ | L | NO | R |
| 6 | $\frac{1881}{1887}$ | $\frac{A}{G}$ | M | NO | S |

FIG. 19

CDMA SIGNAL TRANSMISSION CONTROL

BACKGROUND OF THE INVENTION

I. Field of the Invention

The present invention relates to Code Division Multiple Access (CDMA) systems. More particularly, the present invention includes, but is not limited to, a novel and improved CDMA base station that performs various combinations of the following: 1) decresting CDMA signal peaks, 2) shaping the in-band frequency spectrum of CDMA signals, 3) generating a ratio of in-band to out-of-band signal strength, and/or 4) controlling transmit power based on quadrature signal calculations.

II. Description of the Related Art

Code Division Multiple Access (CDMA) technology is commonly used in communications systems. In a typical CDMA system, a CDMA base station transmits a CDMA signal to numerous CDMA communications devices, such as wireless telephones. The CDMA signal is comprised of numerous individual user signals. The CDMA base station generates the CDMA signal by encoding each individual user signal with a unique spreading sequence, such as a pseudo random sequence. The CDMA base station then adds the encoded user signals together to form the CDMA signal.

In a CDMA system, individual user signals are not separated based on frequency or time, but are spread across the entire frequency band. Each CDMA communications device derives its particular user signal based on the unique spreading sequence. Due to this combination of multiple signals encoded with random sequences, the CDMA signal has random signal peaks that cause problems when the CDMA signal is amplified. In contrast, non-CDMA signals do not typically have such random characteristics. For example, a frequency modulated signal fits within a constant signal envelope because individual user signals are placed within discreet frequency bands and are not combined or encoded with random sequences.

CDMA signal transmission has special power concerns because the CDMA signals are spread across the frequency band. Since the CDMA signals share the frequency band, each signal represents noise to the other signals. Thus, CDMA transmission systems must carefully track the power of each signal.

Baseband CDMA signals are typically generated in a well-known quadrature format comprised of quadrature CDMA signals I and Q. Quadrature CDMA signals I and Q are transmitted using carriers of the same frequency, but in phase quadrature. In other words, an RF CDMA signal can be constructed by modulating I by cosine (2×pi×frequency× time) and by modulating Q by sine (2×pi×frequency×time). In IS-95A, quadrature signals carry the same data with different pseudo-random sequence codes.

FIG. 1 illustrates an ideal frequency spectrum of a typical CDMA signal. The vertical axis represents signal power, and the horizontal axis represents frequency. The desired in-band signal power is contained within the bandwidth defined by corner frequencies around a center frequency. A typical example is a 1.25 MHz bandwidth centered about a 1.96 GHz center frequency with corner frequencies at (1.96 GHz–625 KHz) and (1.96 GHz+625 KHz). The signal power drops significantly outside of the bandwidth, but some undesired out-of-band signal power is still present and is shaded on FIG. 1. Out-of band signal power is undesirable because it represents wasted power that interferes with other signals in neighboring frequency bands.

FIG. 2 illustrates a time domain plot of a typical CDMA signal. The vertical axis represents CDMA signal amplitude in volts, and the horizontal axis represents time. The dashed lines represent a maximum positive signal voltage (+Vmax) above the zero voltage point, and a negative maximum signal voltage (–Vmax) below the zero voltage point. The CDMA signal has "peaks" above and below the Vmax voltages. The peaks are shaded on FIG. 2.

FIG. 3 illustrates the operating characteristics of a typical power amplifier used to amplify a CDMA signal. The horizontal axis represents the input signal power (Pin), and the vertical axis represents the output signal power (Pout). If Pin is below a maximum power level (Pmax), then the power amplifier operates in a linear manner where an increase in Pin is matched by a proportional increase in Pout. If Pin is above Pmax, then the power amplifier operates in a nonlinear manner where an increase in Pin is not matched by a proportional increase in Pout. Pout is less than ideal in the nonlinear operating range.

It should be noted that the Vmax voltage levels on FIG. 2 correspond to the Pmax on FIG. 3. Thus, the random signal peaks above +Vmax and below and –Vmax drive the power amplifier above Pmax into the nonlinear operating range. When operated in the nonlinear range, the power amplifier exhibits undesirable performance in the form of decreased fidelity and increased noise. In contrast, the typical Frequency Modulated (FM) signal does not have random signal peaks, so the power amplifier is able to continuously operate below the maximum power level.

The power amplifier generates additional out-of-band signal power when operated in the nonlinear range. Out-of-band signal power is a problem because it interferes with other signals in the neighboring frequency bands. Government agencies, such as the Federal Communications Commission in the United States, strictly regulate the interference caused by out-of-band signal power.

An existing solution to the problem is implemented during base station testing. Test equipment is used to calculate a ratio for a test CDMA signal transmitted by the base station. The ratio represents the in-band signal power versus the out-of-band signal power. The base station transmit power is adjusted during the testing so the ratio is below a maximum value with a margin for some ratio increase under the maximum value. This usually Unfortunately, the ratio is not calculated and is not used during normal base station operation in the field. Test equipment is used to calculate the ratio, and base stations are not equipped to calculate the ratio in the field. Thus, the ratio is not automatically generated and used to control operation in the field where changes in temperature and load alter base station operation.

Another existing solution to this problem is to operate the CDMA base station so a ratio of the power out to the pilot signal does not exceed a value, such as five. This solution is lacking because a maximum power level based on the pilot signal is not an optimal estimate of the point where out-of-band signal power becomes a problem. As a result, the range and capacity of the base station is not optimized.

FIG. 4 depicts a multi-sector base station 1100 that is currently known in the art. The base station 1100 is divided into geographic sectors with callers A–F in sector 1 and callers G–L in sector 2. For the sake of illustration, caller F will move from sector 1 to sector 2 as indicated by the dashed lines, but the operation of the base station 1100 is first discussed prior to the caller F move from sector 1 to sector 2. Those skilled in the art will appreciate that the diagram of the base station 1100 has been simplified for clarity.

The sector 1 portion of the base station 1100 includes cell site modems 1102 and 1104, gain control 1106, summing circuit 1108, CDMA signal processor 1110 including gain 1112, and antenna 1114. The sector 2 portion of the base station 1100 includes cell site modems 1122 and 1124, gain control 1126, summing circuit 1128, CDMA signal processor 1130 including gain 1132, and antenna 1134.

In operation, the cell site modem 1102 receives signals for callers A, B, C and applies conventional CDMA processing to generate CDMA quadrature signals I and Q. The cell site modem 1102 provides the CDMA quadrature signals I and Q to the summing circuit 1108. The cell site modem 1104 receives signals for callers D, E, F and applies conventional CDMA processing to generate CDMA quadrature signals I and Q. The cell site modem 1104 provides the CDMA quadrature signals I and Q to the summing circuit 1108. The summing circuit separately combines the I signals and the Q signals and transfers them to the CDMA signal processor 1110. The CDMA signal processor 1110 performs analog conversion, filtering, up-conversion, and amplification to provide a Radio Frequency (RF) CDMA signal to the antenna 1114. The antenna 1114 transmits the RF CDMA signal 1116 over the air to the callers A–F in sector 1.

The cell site modem 1122 receives signals for callers G, H, I and applies conventional CDMA processing to generate CDMA quadrature signals I and Q. The cell site modem 1122 provides the CDMA quadrature signals I and Q to the summing circuit 1128. The cell site modem 1124 receives signals for callers J, K, L and applies conventional CDMA processing to generate CDMA quadrature signals I and Q. The cell site modem 1124 provides the CDMA quadrature signals I and Q to the summing circuit 1128. The summing circuit separately combines the I signals and the Q signals and transfers them to the CDMA signal processor 1130. The CDMA signal processor 1130 performs analog conversion, filtering, up-conversion, and amplification to provide an RF CDMA signal to the antenna 1134. The antenna 1134 transmits the RF CDMA signal 1136 over the air to the callers G–L in sector 2.

Each cell cite modem 1102, 1104, 1122, and 1124 provides gain information 1118 to both the gain control 1106 and the gain control 1126. The gain information 1118 includes the squared gain for each call, pilot signal, and overhead. Gain control 1106 and gain control 1126 each maintain a database that incorporates the gain information 1118.

The CDMA signal processor 1110 monitors the transmit power (Pout) of the CDMA signal 1116 for sector 1 and provides a Pout value 1119 for sector 1 to the gain control 1106. The gain control 1106 compares the Pout value 1119 for the CDMA signal 1116 to a Gain Value (GV) equal to the sum of the squared gains for the CDMA signal 1116. The squared gains for the CDMA signal 1116 are obtained from the gain information 1118. The gain control 1106 transfers a control signal 1117 to the gain 1112 to adjust the Pout to maintain a ratio of GV to Pout at a pre-determined value.

FIG. 5 shows the desired relationship between Pout and the GV. The points X and Y represent operational measurements, and the arrows represent the control applied through the control signal 1117 to the gain 1112 to maintain the pre-determined value. Those skilled in the art are aware that the slope of the pre-determined value blossoms during start-up and wilts during shut-down.

On FIG. 4, the CDMA signal processor 1130 monitors the Pout for sector 2 and provides the Pout value 1139 for sector 2 to the gain control 1126. The gain control 1126 compares the Pout value 1139 for the CDMA signal 1136 to a GV equal to the sum of the squared gains for the CDMA signal 1136. The squared gains for the CDMA signal 1136 are obtained from the gain information 1118. The gain control 1126 transfers a control signal 1137 to the gain 1132 to adjust the Pout to maintain a ratio of GV to Pout at a pre-determined value.

When caller F moves from sector 1 to sector 2, the cell site modem 1104 or sector 1 transfers the caller F quadrature signals 1141 and 1142 to the summing circuit 1128 for sector 2. Thus, the CDMA signal 1136 now includes the caller F signal. As a result, the gain control 1126 must now add the square of the caller F gain to its GV.

It should be appreciated that each cell site modem must transfer all gain information 1118 to the gain control in each sector. This requires a data transfer arrangement across all sectors, and much of the transferred data is unnecessary. For example, gain control 1126 does not need the gain for caller A unless caller A moves into sector 2. The gain control for each sector must also track the calls in its sector and perform repeated calculations based on a changing database.

CDMA systems would be improved by techniques to reduce the noise contribution of the power amplifier in the base station. The noise reduction would directly increase the power and efficiency of the CDMA base station. CDMA systems would also be improved through transmission at a power level just below the point where out-of-band signal power becomes a problem. Transmission at this power level would optimize the range and capacity of the base station. In addition, the current power calculation technique for CDMA base stations should be improved to reduce data transfer and storage.

SUMMARY OF THE INVENTION

The above-described problems are solved with CDMA transmission control technology. This technology can include decresting logic that reduces or eliminates random peaks in the CDMA signal. The power amplifier in a CDMA base station can then operate at increased power levels without exceeding out-of-band signal power limitations. Testing has shown a base station power increase of 3dB when decresting technology is used.

The decresting logic generates a correction signal in response to peaks in the CDMA signal that exceed a threshold. The threshold typically corresponds to the maximum power level of a power amplifier. The decresting logic combines the correction signal with the CDMA signal to generate a decrested CDMA signal with reduced peaks. In some examples of the invention, the decresting logic processes polar coordinate representations of the quadrature components of the CDMA signal to generate the correction signal.

The transmission control technology can include spectral shaping logic that reduces the out-of-band signal power in the CDMA signal. The spectral shaping logic attenuates the in-band CDMA signal near the corner frequencies to reduce components that provide a disproportionate contribution to out-of-band signal power. The power amplifier in the CDMA base station can then operate at higher power levels without exceeding out-of-band signal power limitations.

The transmission control technology can include ratio logic that allows a CDMA base station to operate at an optimized power level without generating improper amounts of out-of-band noise. Ratio logic automatically generates a ratio of the CDMA signal strength of the in-band components versus the out-of-band components to eliminate the need use pre-set margins for ratio increases in the field. In some examples of the invention, the ratio logic uses the ratios to generate metric signals that indicate if transmit power should be limited and that indicate excess forward link capacity. In some examples of the invention, the ratio logic uses the ratios to set the decresting threshold.

The transmission control technology can include power control logic that controls the transmit power of the CDMA signal. The power control logic eliminates unnecessary data transfer and storage because gain control is accomplished without transferring or using per call gain information. The power control logic generates a ratio based on the power of the transmitted signal and a power value generated from quadrature components of the CDMA signal. The power control logic generates a power control signal based on the ratio. In some examples of the invention, the decresting logic provides the power value.

The transmission control technology causes a CDMA base station to operate more efficiently. The transmission control technology also causes the CDMA base station to operate with a greater range or capacity. This improvement is passed on to the wireless communications user in the form of higher quality and lower cost.

BRIEF DESCRIPTION OF THE DRAWINGS

The features, objects, and advantages of the present invention will become more apparent from the detailed description set forth below when taken in conjunction with the drawings in which like reference characters identify correspondingly throughout and wherein:

FIG. 19 depicts a logical table used for RIO control;

DETAILED DESCRIPTION OF THE PREFERRED EMBODIMENTS

Figure 6:
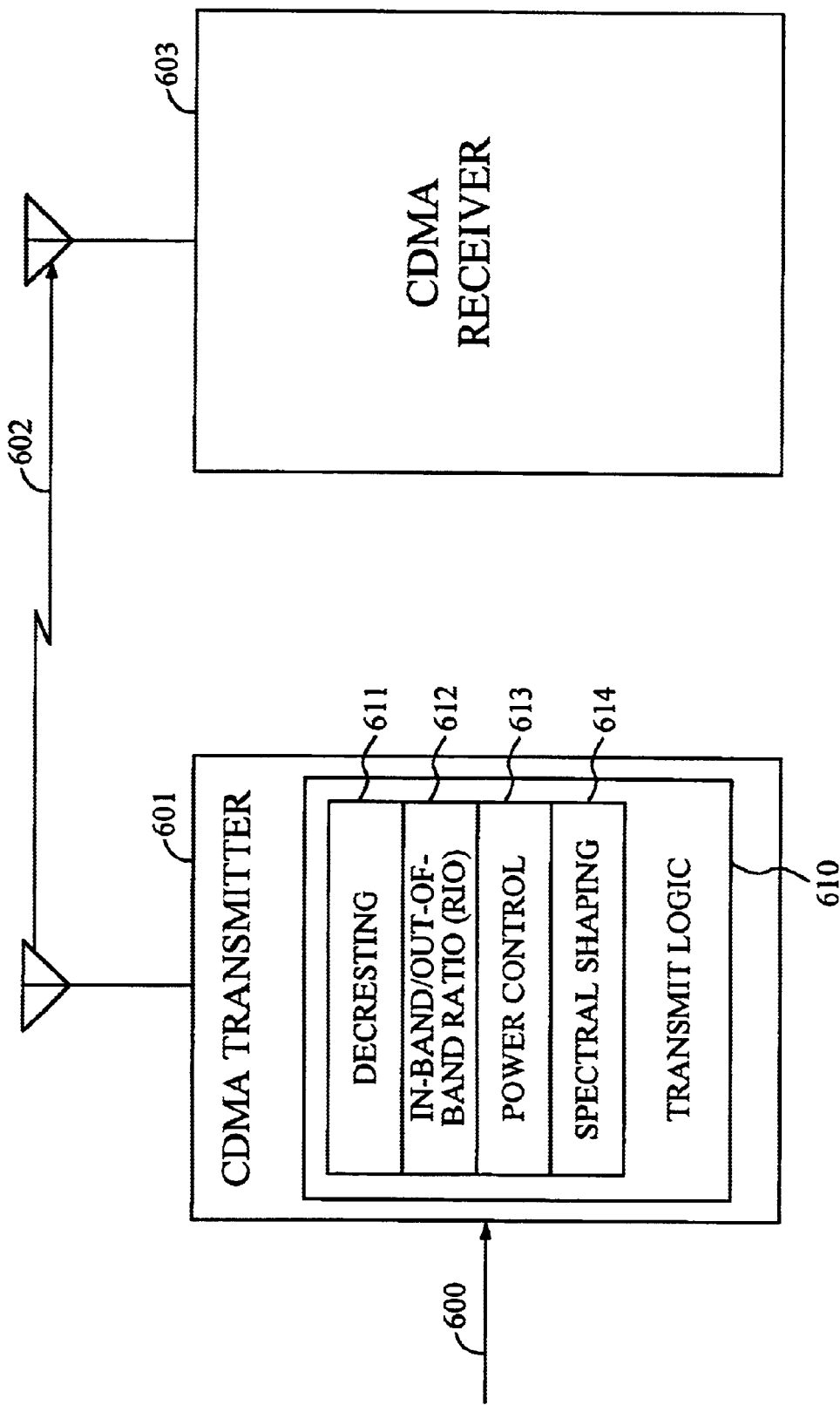
FIG. 6 is a block diagram of a CDMA transmitter with transmit logic.

CDMA Transmitter—FIG. 6

FIG. 6 depicts a baseband CDMA signal 600, a CDMA transmitter 601, an RF CDMA signal 602, and a CDMA receiver 603. CDMA is a spread-spectrum communications technology. Some versions of CDMA are specified by standards, such as IS-95 approved by the Telecommunications Industry Association. The CDMA signal 600 could be any CDMA signal, such as the signal produced by a cell site modem in a CDMA base station. The CDMA receiver 603 could be any CDMA device capable of receiving a CDMA signal, such as a wireless CDMA telephone.

The CDMA transmitter 601 could be any CDMA transmission device that includes at least some of the functionality of transmit logic 610. This functionality includes decresting 611, in-band to out-of-band ratio (RIO) 612, power control 613, and spectral- shaping 614. Decresting 611 reduces peaks in the CDMA signal 600. RIO 612 generates a ratio based on the signal strength of in-band versus out-of-band portions of the CDMA signal 602. Power control 613 adjusts the gain of the CDMA signal 602 based on quadrature signal calculations. Spectral shaping 614 attenuates in-band portions of the CDMA signal 600 adjacent to the corner frequencies.

In operation, the CDMA transmitter 601 receives the CDMA signal 600. Decresting 611 generates a correction signal in response to peaks in the CDMA signal 600 that exceed a threshold. Decresting 611 then combines the correction signal with the CDMA signal 100 to generate a decrested CDMA signal with reduced peaks. The decrested signal is provided to spectral shaping 614. Spectral shaping 614 attenuates in-band portions of the decrested signal near the corner frequencies. The attenuation reduces the out-of-band noise caused by amplification of the CDMA signal. The attenuation should not be allowed to degrade the CDMA signal 602 to an unacceptable level. RIO 612 processes a copy of the CDMA signal 602 to generate the in-band to out-of-band signal ratios. The ratios are used to control the capacity and/or gain of the CDMA transmitter 601. The ratios can also are used to set the decresting threshold. Power control 613 processes quadrature components of the CDMA signal 600 to generate a gain control signal. The gain control signal is used to adjust the gain of the CDMA signal 602.

The CDMA transmitter 601 transmits the CDMA signal 602 to the CDMA receiver 603 over the air interface. Although the invention is depicted using an air interface, other transmission media could also be used, such as RF cable, power lines, or telephone lines.

Figure 7:
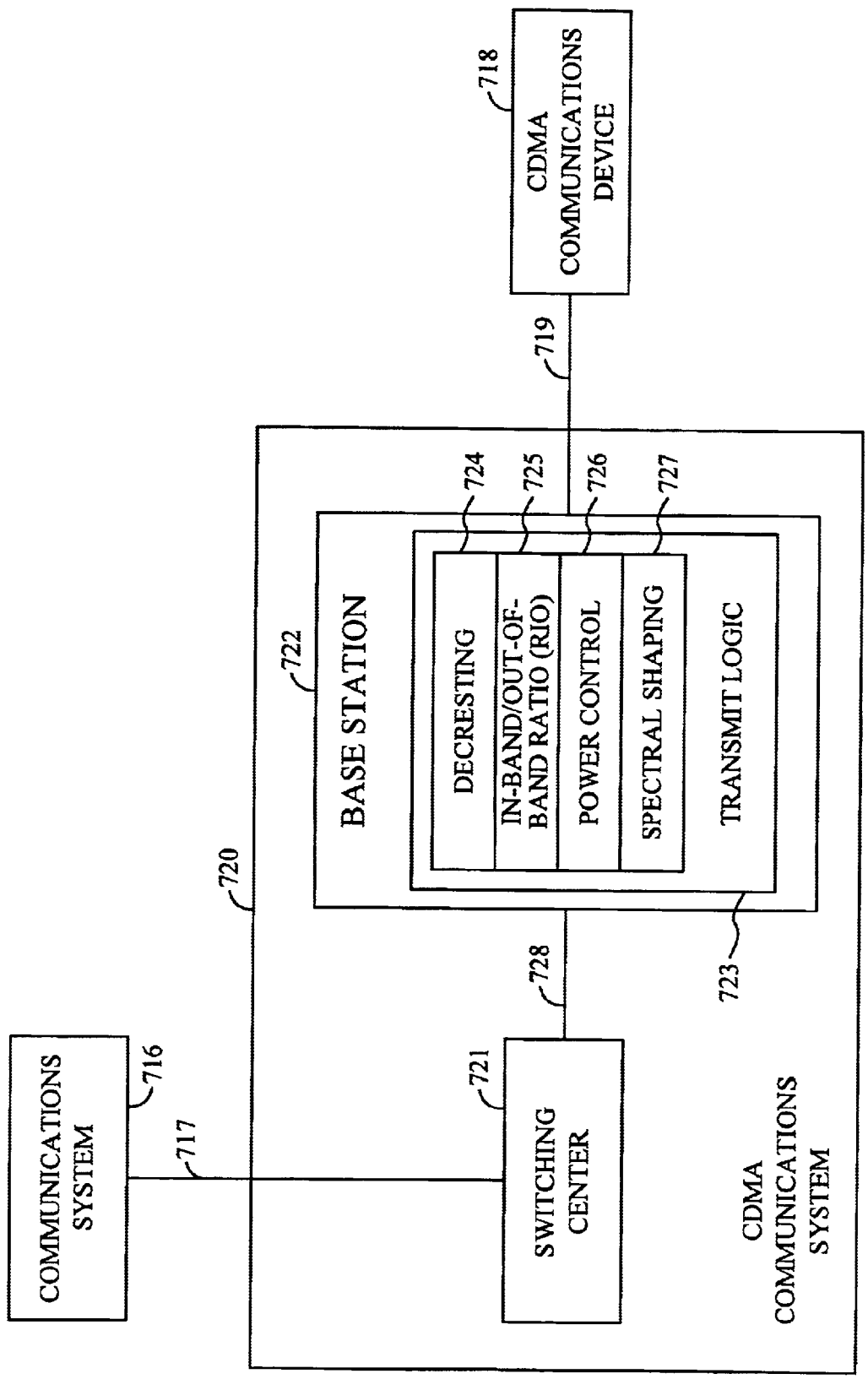
FIG. 7 is a block diagram of a CDMA communications system with transmit logic.

CDMA Communications System—FIG. 7

FIG. 7 depicts a specific example of a CDMA system that uses transmit logic 723, but those skilled in the art will recognize numerous other types of CDMA systems that are applicable to the invention described above. FIG. 7 depicts a communications system 716 that is connected to a CDMA communications system 720. The CDMA communications system 720 communicates with CDMA communications devices 718. The CDMA communications system 720 is comprised of a switching center 721 and a base station 722. The communications system 716 exchanges communications signals 717 with the switching center 721. The switching center 721 exchanges communications signals 728 with the base station 722. The base station 722 exchanges wireless CDMA communications signals 719 over the air interface with the CDMA communications devices 718.

The communications system 716 could be any communications system capable of exchanging communications signals 717 with the CDMA communications system 720. The communications system 716 is typically a conventional public telephone network, but could also be many other networks, such as a local area network, wide area network, or internet.

The switching center 721 could be any device that provides an interface between the base station 722 and the communications system 716. Typically, numerous base stations are connected to the communications system 716 through the switching center 721, but the number of base stations has been restricted for the purpose of clarity.

The base station 722 exchanges wireless CDMA signals 719 with the CDMA communications devices 718. The base station 722 includes transmit logic 723 that provides the functionality of the present invention. The functionality could include various combinations of the following: decresting 724, RIO 725, power control 726, and spectral shaping 727. Typically, numerous CDMA communications devices exchange signals with the base station 722, but the number of communications devices has been restricted for the purpose of clarity. Those skilled in the art could adapt the base station 722 from known systems, such as the base stations provided by Qualcomm, Inc. of San Diego, Calif.

The CDMA communications devices 718 exchange wireless CDMA signals 719 with the base station 722. The typical CDMA communications device is a mobile telephone, but other CDMA communications devices are also possible, such as fixed wireless devices, data terminals, set-top boxes, or computers. In operation, the CDMA communications devices 718 communicate through the CDMA communications system 720 with the communications system 716 or with each other. The transmit logic 723 in the base station 722 operates on the communications path from the communications system 716 to the CDMA communications devices 718.

Figure 8:
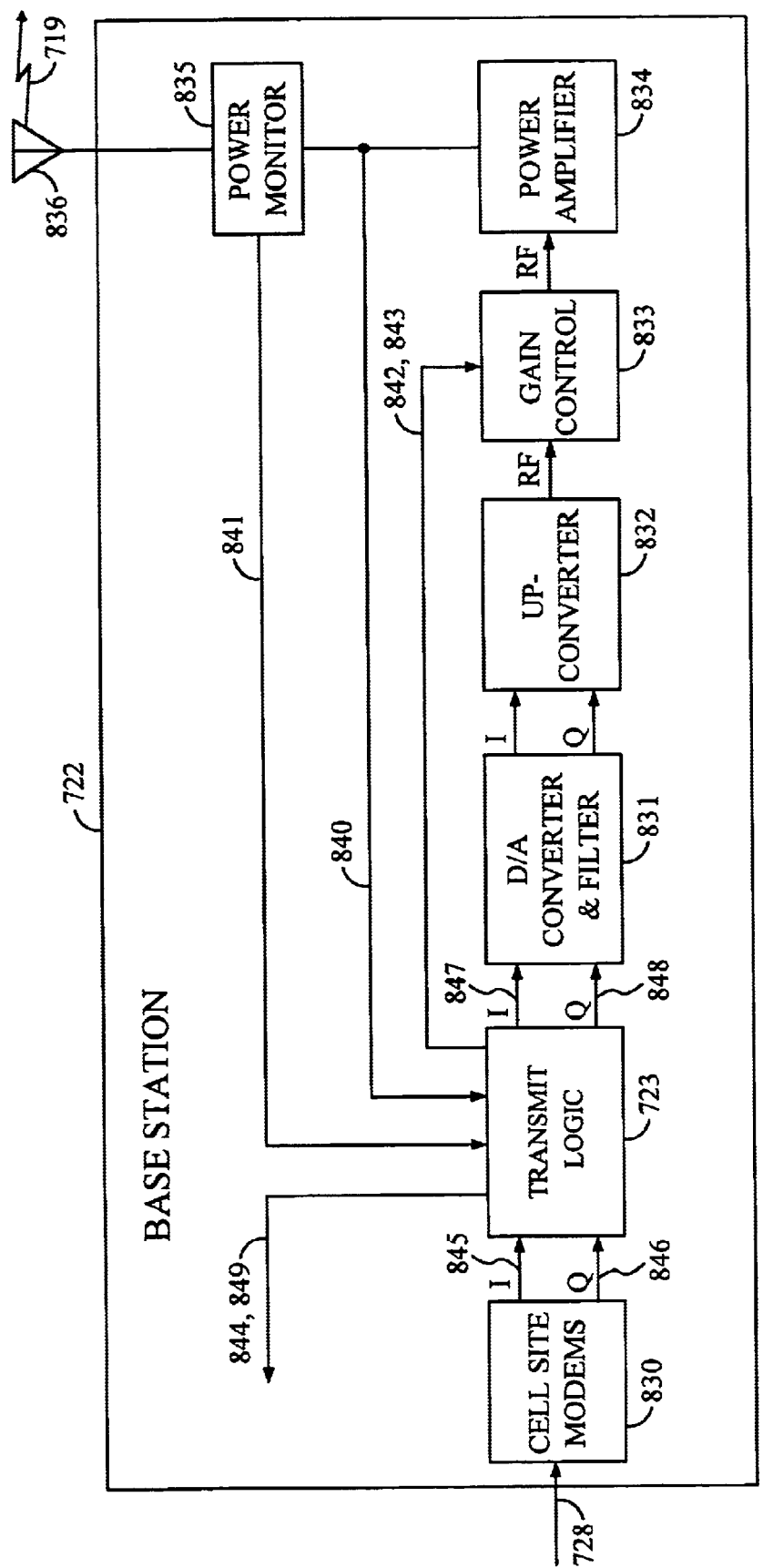
FIG. 8 is a block diagram of a CDMA base station with transmit logic.
Figure 9:
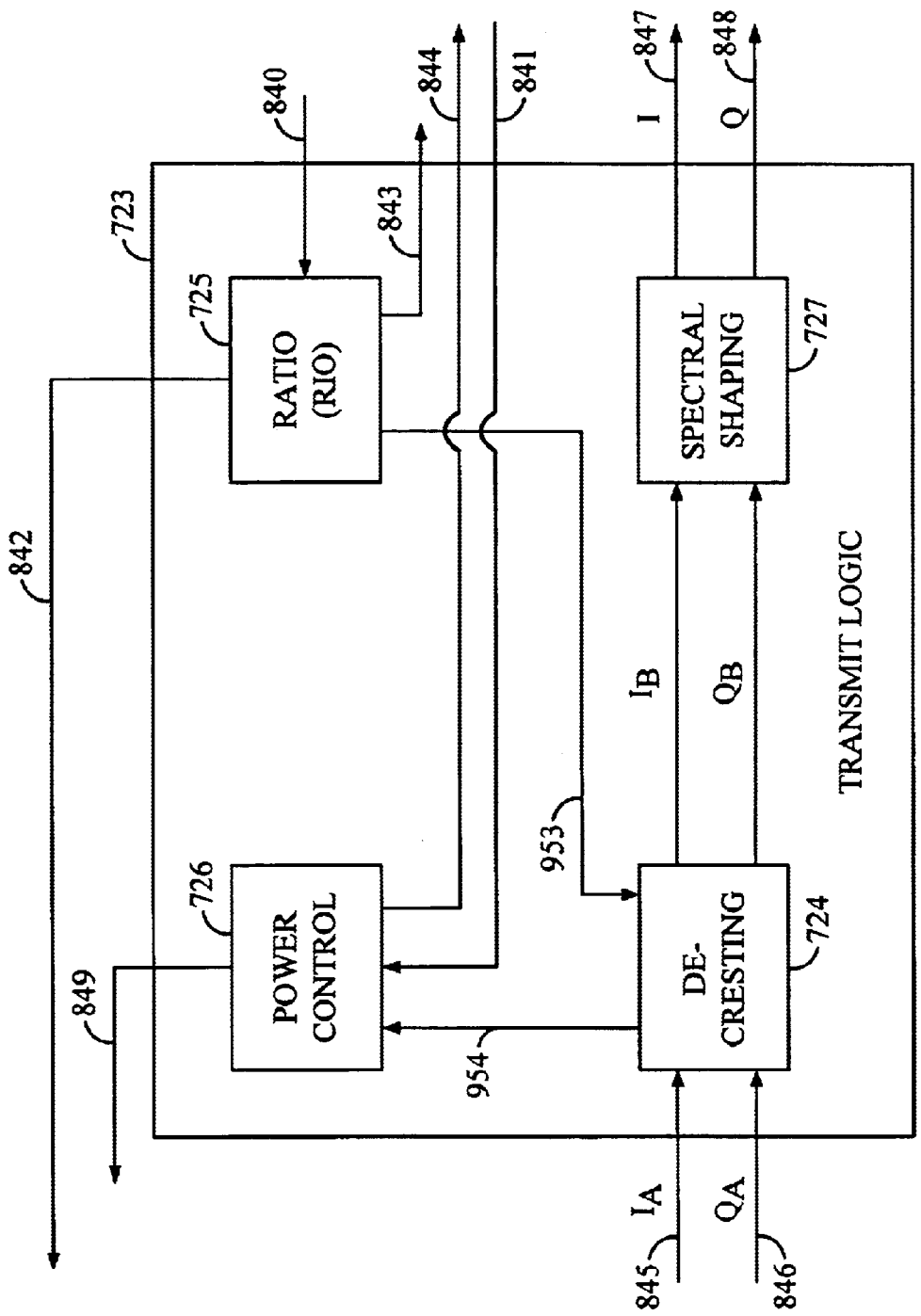
FIG. 9 is a block diagram of the transmit logic.

CDMA Base Station with Transmit Logic—FIGS. 8–9

FIG. 8 depicts the base station 722 of FIG. 7 receiving the communications signals 728 and transmitting the CDMA communications signals 719. The base station 722 could be a multi-sector base station with the components of FIG. 7 replicated for each sector. The base station 722 is comprised of the following elements connected in series: cell site modems 830, transmit logic 723, digital-to-analog converter and filter 831, up-converter 832, gain control 833, power amplifier 834, power monitor 835, and antenna 836. Aside from the transmit logic 723, those skilled in the art are familiar with these elements and their operation.

The cell site modems 830 produce a CDMA signal comprised of quadrature signals 845 and 846. Quadrature CDMA signals are well-known and are baseband signals to be transmitted using carriers of the same frequency, but in phase quadrature. The cell site modems 830 may apply forward error correction coding before transferring the quadrature signals 845 and 846 to the transmit logic 723.

The transmit logic 723 processes the quadrature signals 845 and 846 in accord with the invention and provides the resulting quadrature signals 847 and 848 to the digital-to-analog converter and filter 831. The transmit logic 723 receives also receives signals 840, 841, and provides signals 842, 843, 844, and 849. These signals and transmit logic 723 are described in detail further below.

The digital-to-analog converter and filter 831 converts the quadrature signals 847 and 848 to analog and filters out components outside of the desired bandwidth. The digital-to-analog converter and filter 831 provides the analog quadrature signals to the up-converter 832. The up-converter 832 modulates the analog quadrature signals with intermediate and radio frequencies to form an RF CDMA signal and provides the RF CDMA signal to the gain control 833. The gain control 833 adjusts the gain of the RF CDMA signal based on the gain control signals 842, 843 and provides the gain-adjusted RF CDMA signal to the power amplifier 834. The power amplifier 834 amplifies the RF CDMA signal and provides the amplified RF CDMA signal to the power monitor 835. The power monitor 835 monitors the transmit power of the RF CDMA signal and provides signal 841 indicating transmit power to the transmit logic 723. The power monitor 835 provides the RF CDMA signal to the antenna 836. The antenna 836 transmits the RF CDMA signal 719

FIG. 9 depicts the transmit logic 723 from FIGS. 7–8. Transmit logic 723 includes various combinations of the following in various examples of the to invention: decresting 724, RIO 725, power control 726, and spectral shaping 727. Decresting 724 receives the quadrature signals 845 and 846, which are referred to as Ia and Qa respectively. Decresting 724 processes the quadrature signals Ia and Qa to generate correction signals that correspond to signal peaks that exceed a threshold. The correction signals are combined with the quadrature signals Ia and Qa to eliminate or reduce the signal peaks. Decresting provides the resulting decrested quadrature signals Ib and Qb to spectral shaping 727. Spectral shaping 727 is comprised of digital filters that attenuate the strength of the in-band quadrature signals Ib and Qb to provide the shaped quadrature signals 847 and 848.

RIO 725 receives the signal 840 which is a copy of the RF CDMA signal provided to the antenna 719 for transmission. RIO 725 processes the signal 840 to generate ratios of in-band to out-of-band signal strength. Signal strength can be measured in various ways with examples being power, voltage, or energy. RIO 725 compares the ratios to pre-determined values that represent the point where out-of-band signal power becomes improper. RIO 725 generates a capacity metric signal 842 and a power metric signal 843 based on the comparison. If one of the calculated ratios exceeds its associated pre-determined value, then the power metric signal 843 indicates that the transmit power of the base station 722 should be limited. The capacity metric signal 842 indicates an estimate of the excess forward link capacity of the base station 722. The estimate is typically given in a number of additional simultaneous calls that can be handled by the base station 722 without one of the calculated ratios exceeding its associated pre-determined value. RIO 725 also generates a threshold metric signal 953 based on the comparison.

Power control 726 receives the signal 841 from the power monitor 835 and the signal 954 from decresting 724. The signal 841 indicates the power of the transmitted CDMA signal 719. The signal 954 indicates a power calculation using the quadrature signals 845 and 846. Power control 726 compares the signals 841 and 954 to generate the signals 844 and 849. The signal 844 is provided to the gain control 833 to adjust the gain. The gain is adjusted to maintain a predetermined ratio of the signals 841 and 954. The signal 849 is a capacity control signal that indicates excess forward link capacity.

Decresting—FIGS. 10–14

Figure 3:
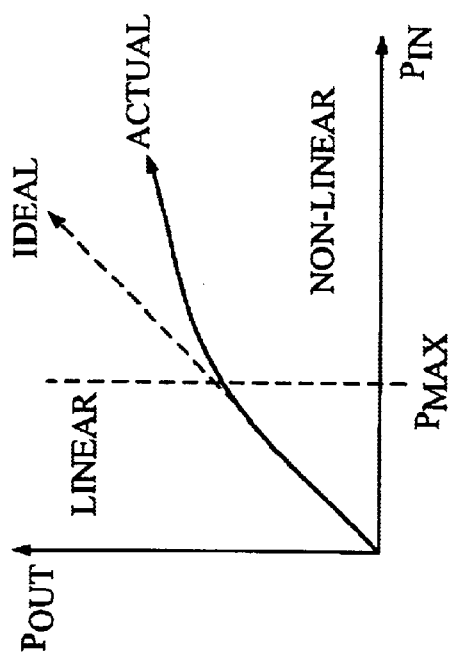
FIG. 3 is a graph illustrating the operating characteristics of a power amplifier.
Figure 2:
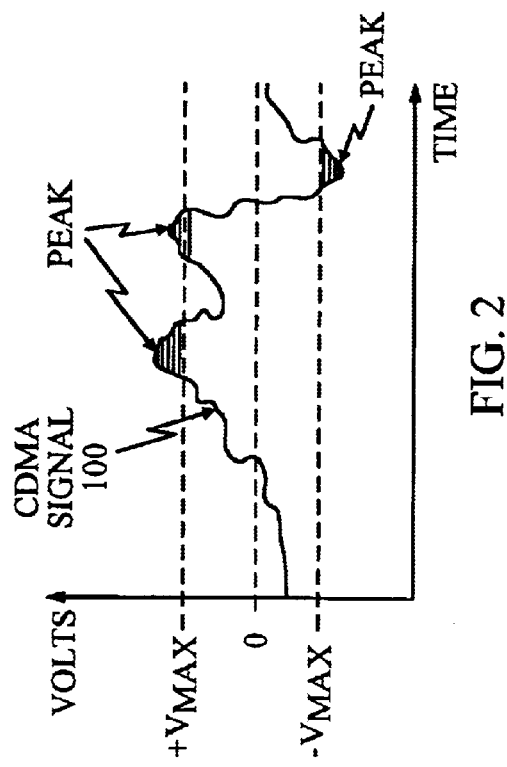
FIG. 2 is a graph illustrating CDMA signal peaks.
Figure 4:
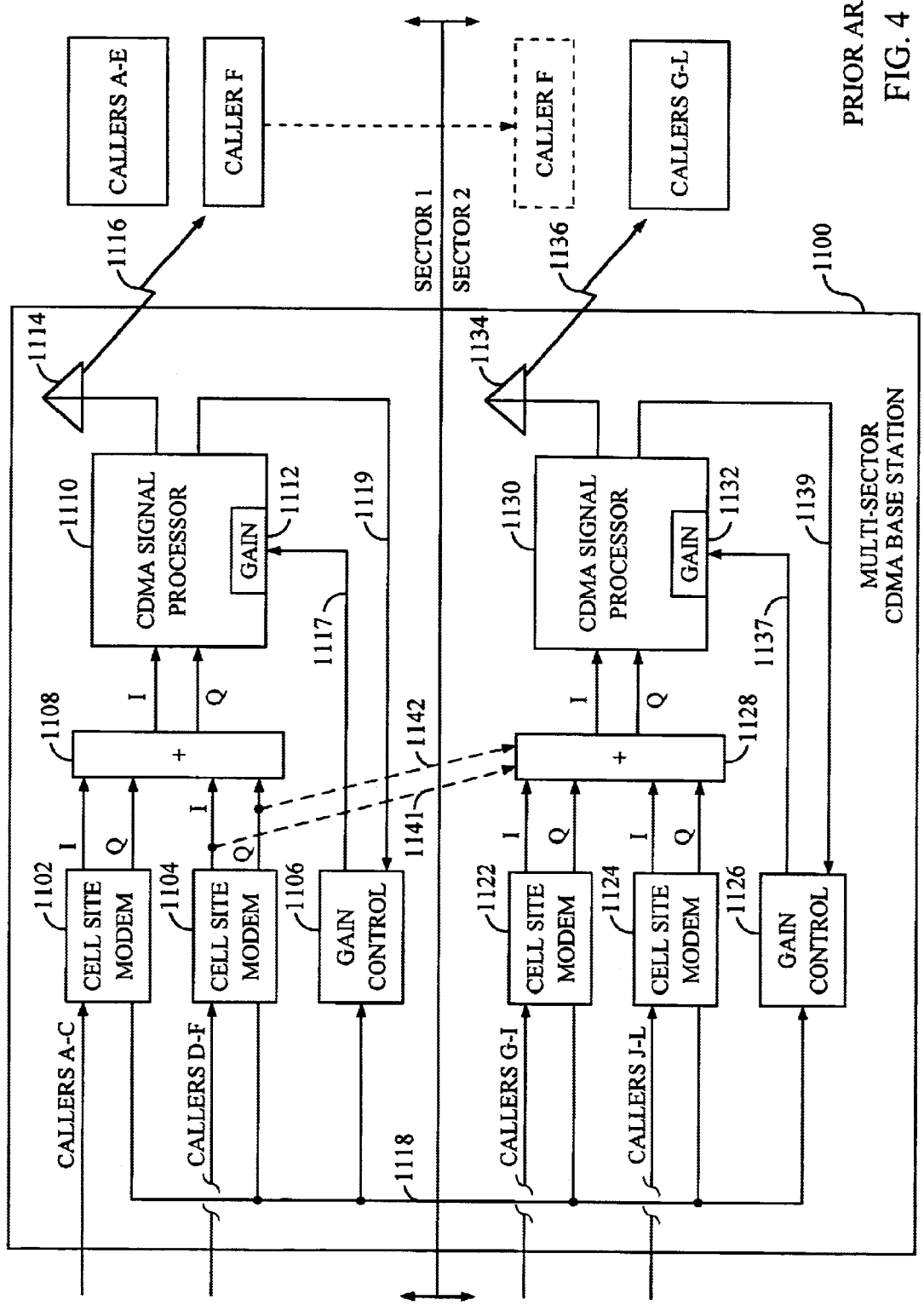
FIG. 4 is a block diagram of a prior art CDMA base station.
Figure 5:
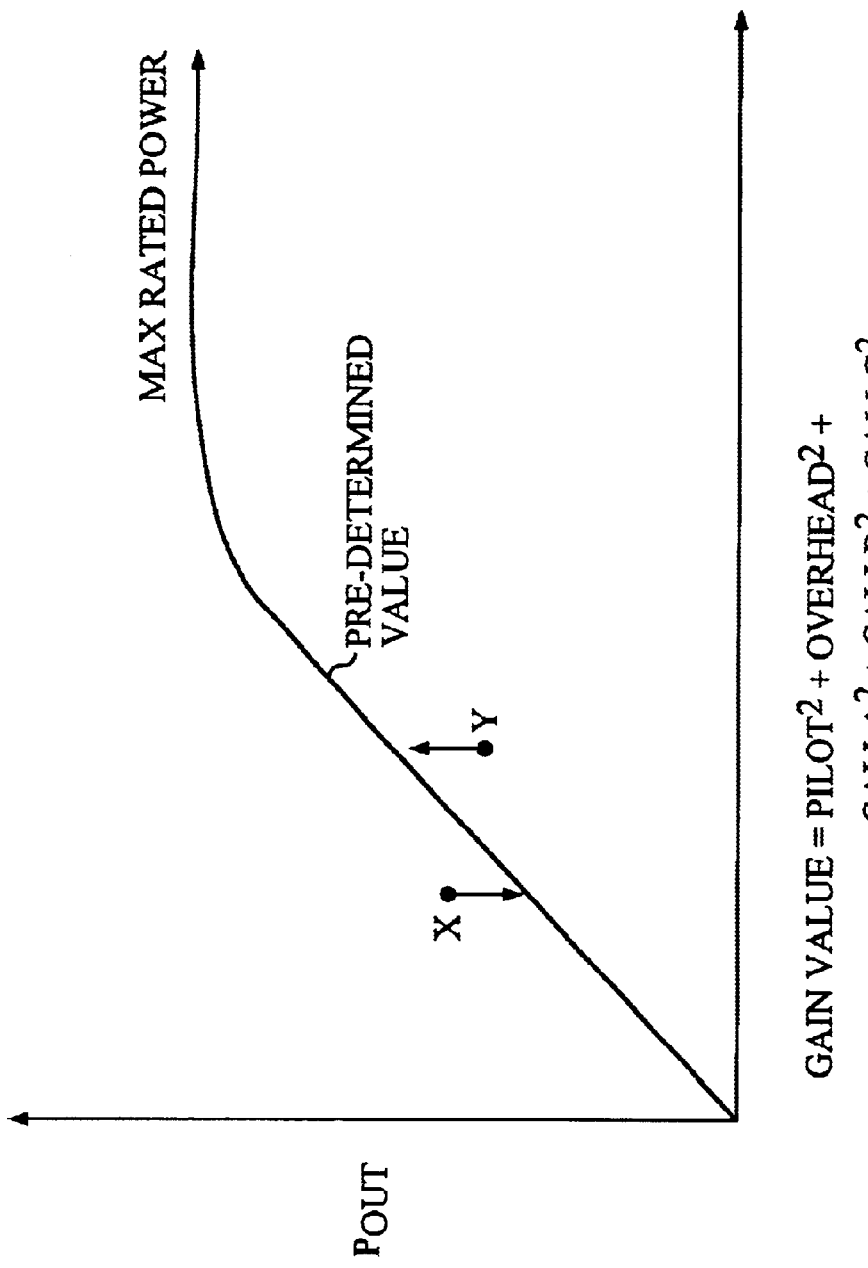
FIG. 5 is a graph illustrating prior art power calculation and control for CDMA signal transmission.

Referring back to FIGS. 2 and 3, it should be noted that the Vmax voltage levels on FIG. 2 correspond to the Pmax on FIG. 3. Thus, the peaks above +Vmax and below and −Vmax would drive the power amplifier above Pmax into the nonlinear operating range. When operated in the nonlinear range, the power amplifier exhibits undesirable performance in the form of decreased fidelity and increased noise. In addition, the CDMA base station does not meet industry specifications, such as unused Walsh energy. Decresting eliminates or reduces the peaks to maintain operation of the power amplifier in the nonlinear range, and thus improves fidelity while reducing noise.

Figure 10:
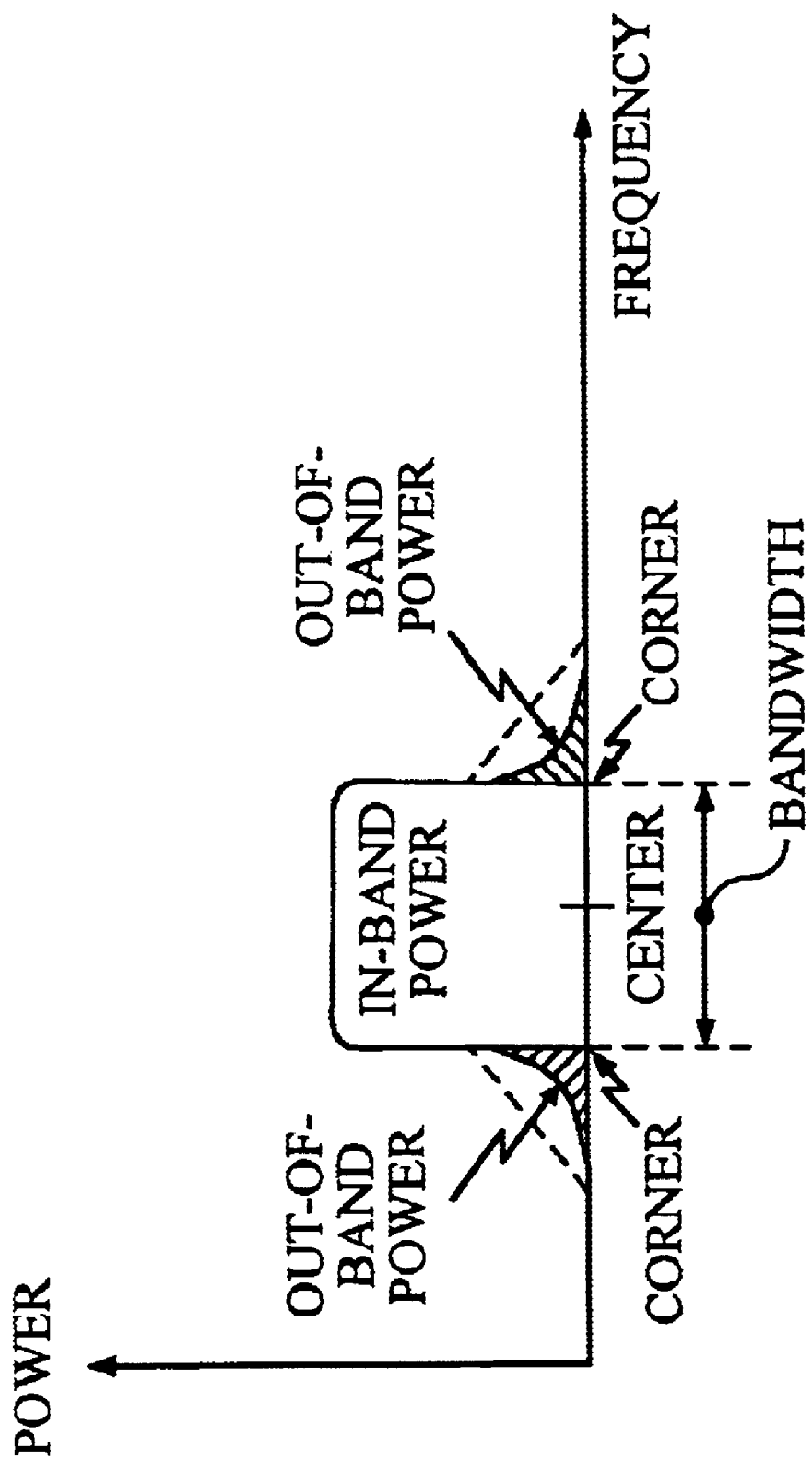
FIG. 10 is a graph illustrating the frequency spectrum of a CDMA signal with decresting.

FIG. 10 illustrates the frequency characteristics of a CDMA signal after decresting. The vertical axis represents signal power, and the horizontal axis represents frequency. The desired "in-band" signal power is contained within the bandwidth defined by corner frequencies that are above and below a center frequency. The signal power drops significantly outside of the bandwidth, but some undesired "out-of-band" signal power is still present, and is shaded on FIG. 10. The dashed lines above the shaded out-of-band power on FIG. 10 represent the additional out-of-band signal power generated when decresting is not used. This additional out-of band signal power is undesirable because it represents wasted power that interferes with other signals in neighboring frequency bands. This reduction in out-of band signal power is typically offset by operating the power amplifier at a higher power level. Advantageously, the power amplifier has greater range or capacity at the higher power level, but does not generate intolerable out-of-band signal power.

Figure 11:
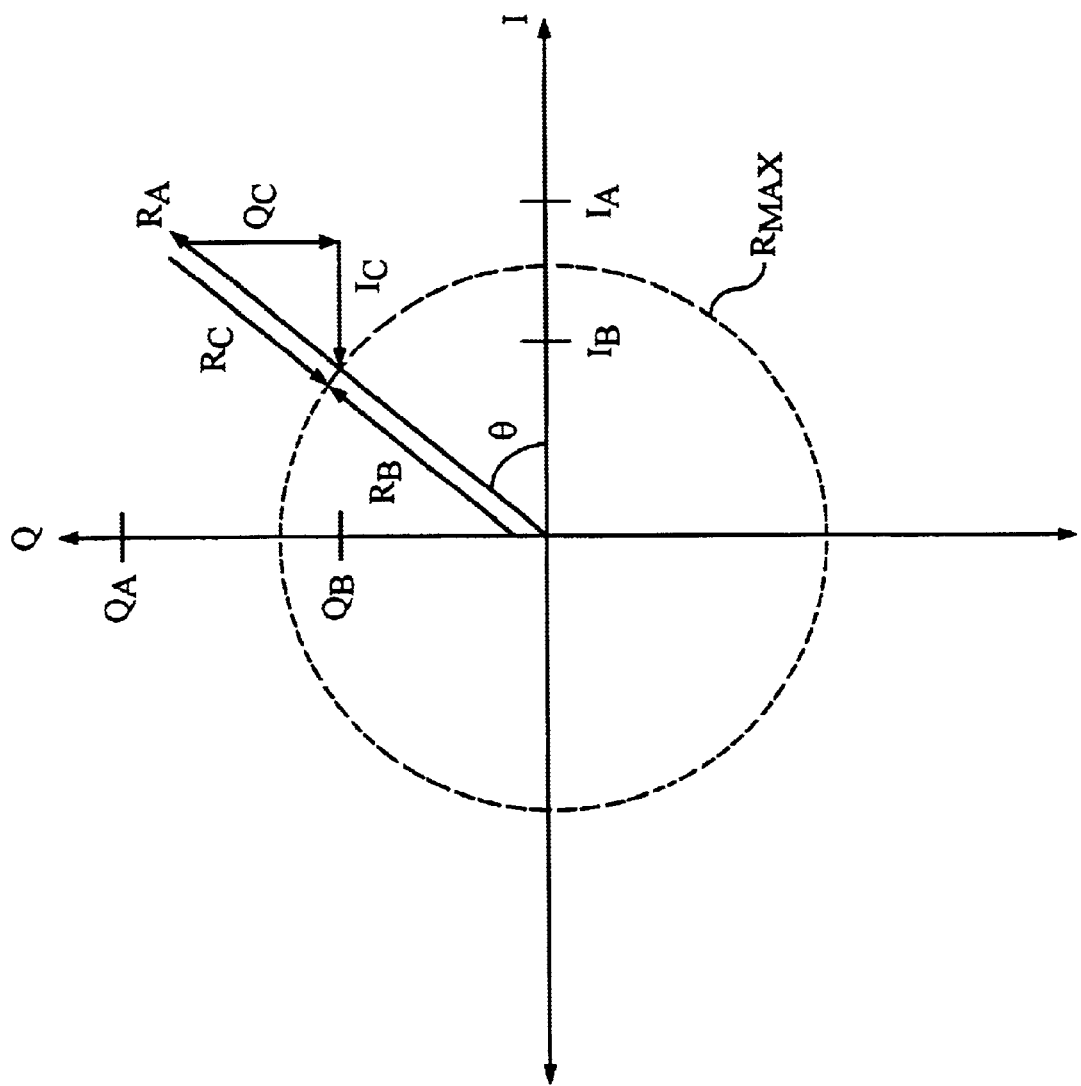
FIG. 11 is a graph illustrating quadrature signals.

FIG. 11 depicts representations of quadrature signals where the vertical axis represents values for Q quadrature signals, and the horizontal axis represents values for I quadrature signals. The time axis comes out of the page. The rectangular coordinate representations of the signals Qa, Qb, Ia, and Ib are indicated on the I axis and Q axis. Radius Ra and angle θ show a polar coordinate representation of the quadrature signals Qa and Ia. Ra represents CDMA signal strength and exceeds a circle labeled Rmax. Other shapes could also be used with some examples being squares or diamonds. Rmax corresponds to the Vmax and the Pmax of FIGS. 2 and 3 respectively. Thus, the portion of Ra beyond Rmax represents a CDMA signal peak. A correction signal Rc would reduce Ra to the Rmax circle. Rc can be represented by quadrature correction signals Qc and Ic. Decresting is achieved by correcting the quadrature CDMA signals Qa and Ia with the quadrature correction signals Qc and Ic to generate the corrected quadrature CDMA signals Qb and Ib. Since decresting occurs in the digital domain, soft limiting is achieved that does not cause the undesired transients of hard limiting in the analog domain.

The threshold Rmax can be set based on various factors, such as: 1) industry specifications for unused Walsh energy, 2) the RIO ratio of in-band to out-of-band signal power, 3) temperature—lower during a cold start, 3) the Eb/Io ratio of bit energy to interference and noise, 4) the IS-97 industry standard Rho metric that is used to measure waveform fidelity, and/or 5) other suitable metrics. Rmax can be adjusted during system operation based on on-going measurements of desired metrics and corresponding adjustment of Rmax to optimize performance.

Figure 12:
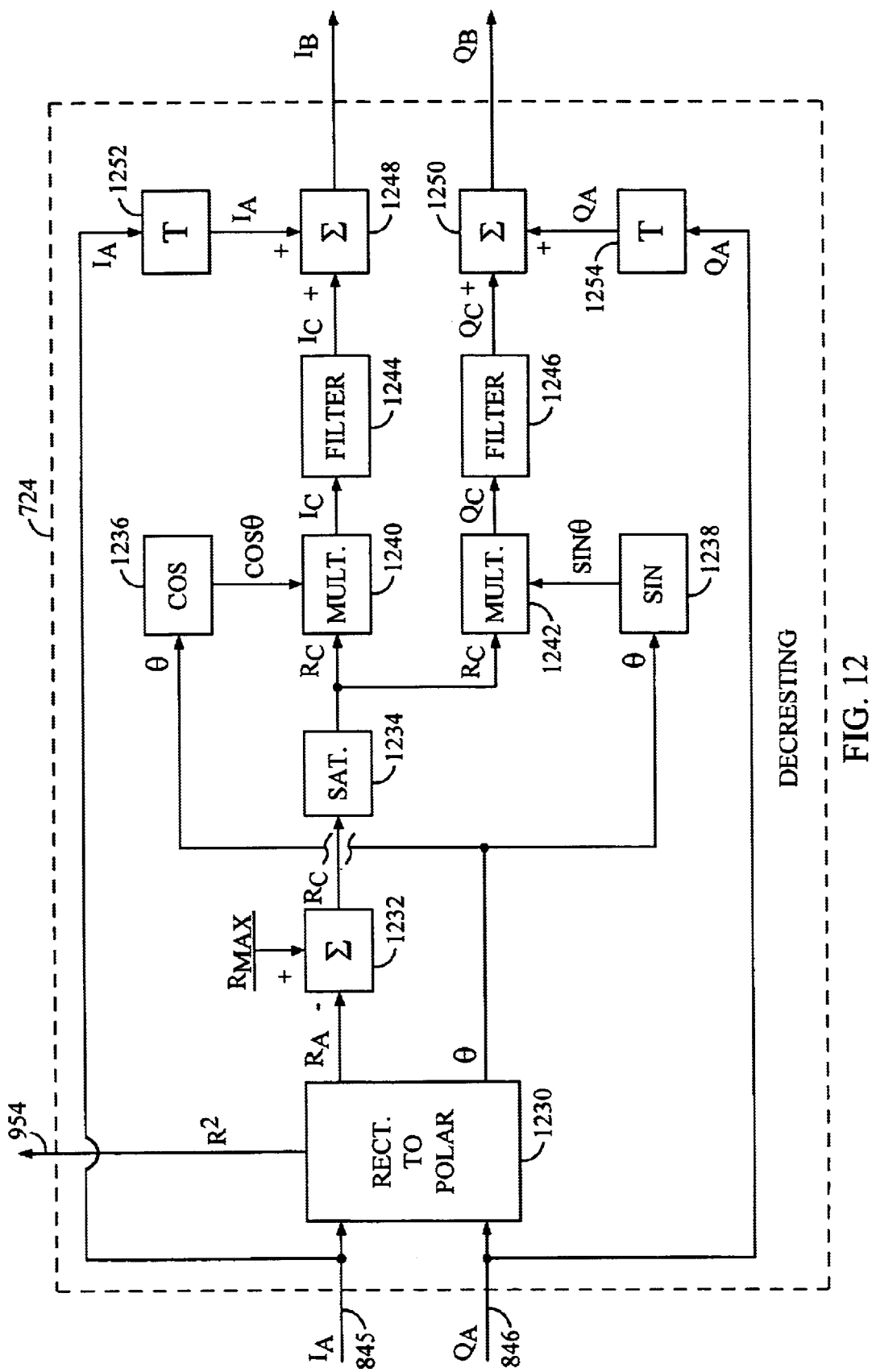
FIG. 12 is a block diagram of decresting logic.

For example, if RIO is used to control the threshold Rmax, then RIO can be periodically measured as Rmax is incrementally increased and decreased by a step-change. If RIO is lowered by an increased Rmax, then Rmax+delta become the new Rmax. If RIO is lowered by a decreased Rmax, then Rmax−delta become the new Rmax. Care should be taken to perform each of these tests under consistent conditions FIG. 12 depicts decresting 724. Decresting 724 receives the rectangular quadrature signals Ia and Qa and generates the corrected quadrature signals Ib and Qb. A rectangular-to-polar conversion element 1230 receives Ia and Qa and generates Ra and θ. Subtraction element 1232 subtracts Ra from Rmax to generate Rc. Rc is negative if Ra exceeds Rmax, which occurs when a peak is encountered. Saturation element 1234 reduces positive values of Rc to zero. The saturation element 1234 provides Rc to the multiplication elements 1240 and 1242. The rectangular-to-polar conversion element 1230 also provides the signal 954 indicating the quadrature signal power calculation to power control 726.

The conversion element 1230 also provides θ to cosine element 1236 and sine element 1238. Cosine element 1236 and sine element 1238 respectively provide cosine θ and sine θ to the multiplication elements 1240 and 1242. The multiplication elements 1240 and 1242 multiply Rc with cosine θ and sine θ to respectively generate Ic and Qc. The multiplication elements 1240 and 1242 respectively provide Ic and Qc to filter elements 1244 and 1246. The filter elements 1244 and 1246 remove out-of-band components from Ic and Qc and respectively provide the signals to addition elements 1248 and 1250. The filtering elements could also remove some in-band components as well. The filtering is important because it converts decresting 723 from a clipping circuit or hard-limiter into a soft-limiter. Soft-limiting is important because it does not generate the unwanted transients that are produced by hard-limiting.

In addition to the conversion element 1230, Ia and Qa are respectively provided to time delay elements 1252 and 1254. The time delay elements 1252 and 1254 introduce a time delay that corresponds to the time required to generate Ic and Qc. The time delay elements 1252 and 1254 respectively provide Ia and Qa to the addition elements 1248 and 1250 so that they match in the time domain with Ic and Qc respectively. The addition element 1248 adds Ic to Ia to produce the corrected quadrature signal Ib. The addition element 1250 adds Qc to Qa to produce the corrected quadrature signal Qb.

Figure 13:
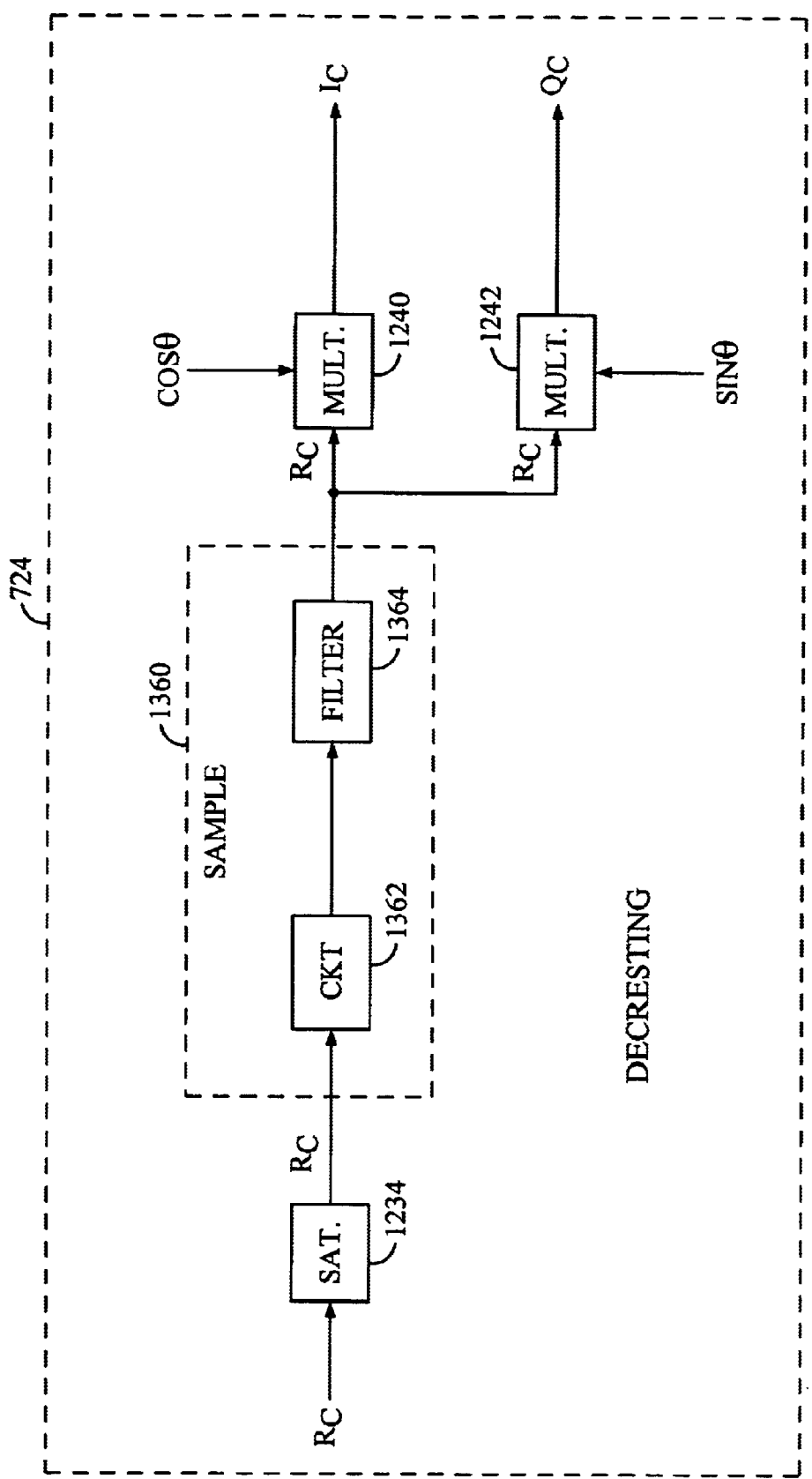
FIG. 13 is a block diagram of alternative decresting logic.

FIG. 13 depicts an alternative version of decresting 723. Essentially, a sampling element 1360 comprising circuitry 1362 and a low-pass filter 1364 is added in between the saturation element 1234 and the multiplication elements 1240 and 1242 on FIG. 12. The remaining configuration and operation is unchanged from FIG. 12.

The saturation element 1234 provides Rc to the sampling element 1360. The circuitry 1362 samples Rc to detect a sample that exceeds the threshold and has the largest magnitude. This largest-magnitude sample represents a high point in the associated CDMA signal peak. The circuitry 1362 passes only this largest-magnitude sample that exceeds the threshold through the low-pass filter 1364. The sampling element 1360 provides the resulting Rc to the multiplication elements 1240 and 1242. The multiplication elements 1240 and 1242 multiply Rc with cosine θ and sine θ to respectively generate Ic and Qc. Ic and Qc are scaled versions of the negative impulse response of the lowpass filter 1364 in sampling element 1360. The scaling is such that the negative impulse responses, when added to the delayed signals Ia and Qa, will reduce the CDMA signal peak from Ra to Rmax.

Figure 14:
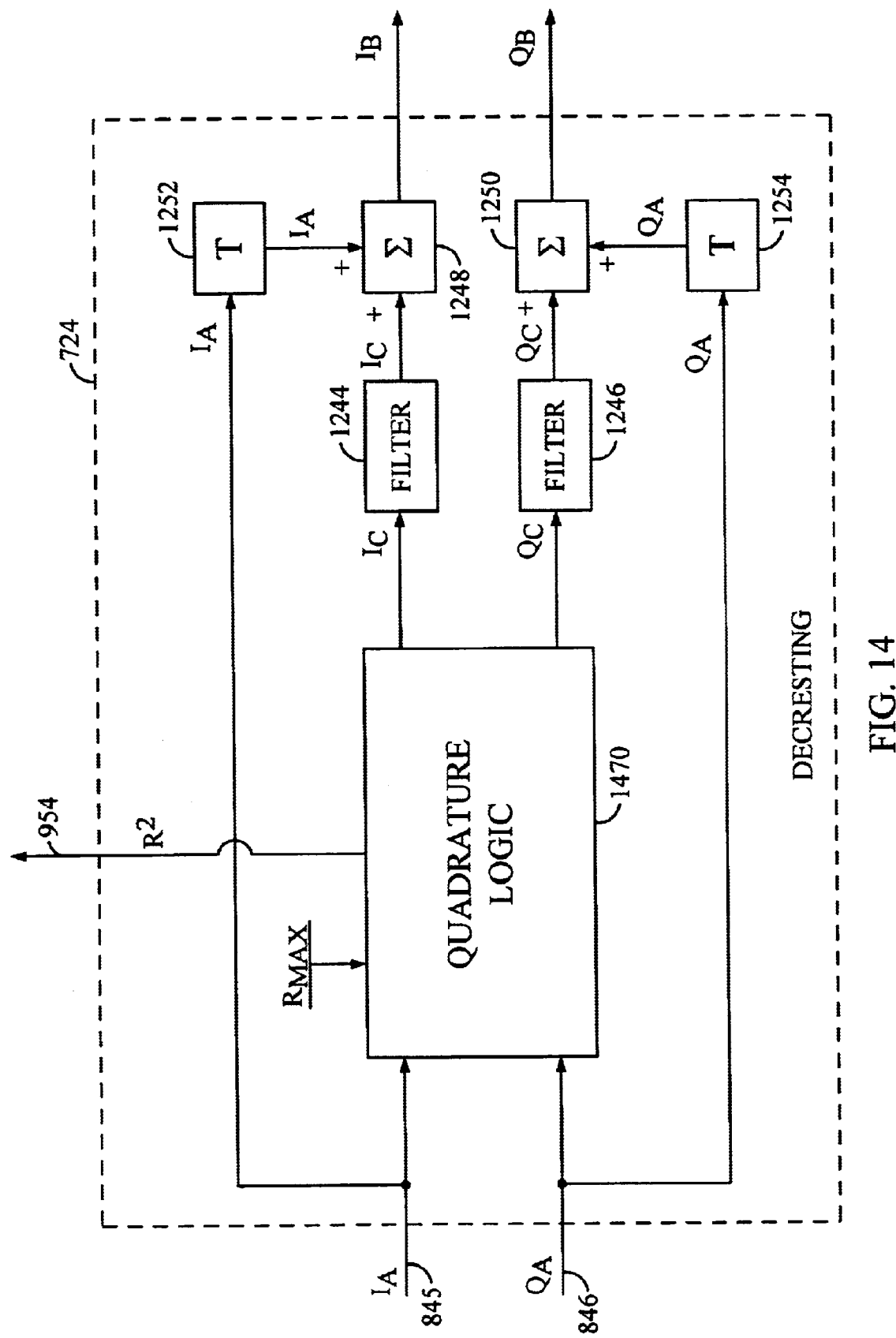
FIG. 14 is a block diagram of alternative decresting logic.

FIG. 14 depicts another alternative version of decresting 723. Essentially, the quadrature logic 1470 replaces the elements 1230–1242 on FIG. 12. On FIG. 14, the decresting 723 receives the rectangular quadrature signals Ia and Qa and generates the corrected quadrature signals Ib and Qb. Quadrature logic 1470 processes Ia, Qa, and Rmax to produce Ic and Rc according to the following equations:

$$Ic = Ia\left[\frac{R\max}{\sqrt{Ia^2 + Qa^2}} - 1\right]$$ and positive bracketed terms are set to zero.

$$Qc = Qa\left[\frac{R\max}{\sqrt{Ia^2 + Qa^2}} - 1\right]$$ and positive bracketed terms are set to zero.

The quadrature logic 1470 provides Ic and Qc to filter elements 1244 and 1246 respectively. The filter elements 1244 and 1246 remove out-of-band components from Ic and Qc and respectively provide the signals to addition elements 1248 and 1250. The quadrature logic 1470 also generates and provides the signal 954 which represents $R^2 = I^2 + Q^2$.

In addition to the quadrature logic 1470, Ia and Qa are respectively provided to time delay elements 1252 and 1254. The time delay elements 1252 and 1254 introduce a time delay that corresponds to the time required to generate Ic and Qc. The time delay elements 1252 and 1254 respectively provide Ia and Qa to the addition elements 1248 and 1250 so that they match in the time domain with Ic and Qc respectively. The addition element 1248 adds Ic to Ia to produce the corrected in-phase signal Ib. The addition element 1250 adds Qc to Qa to produce the corrected in-phase signal Qb.

Figure 15:
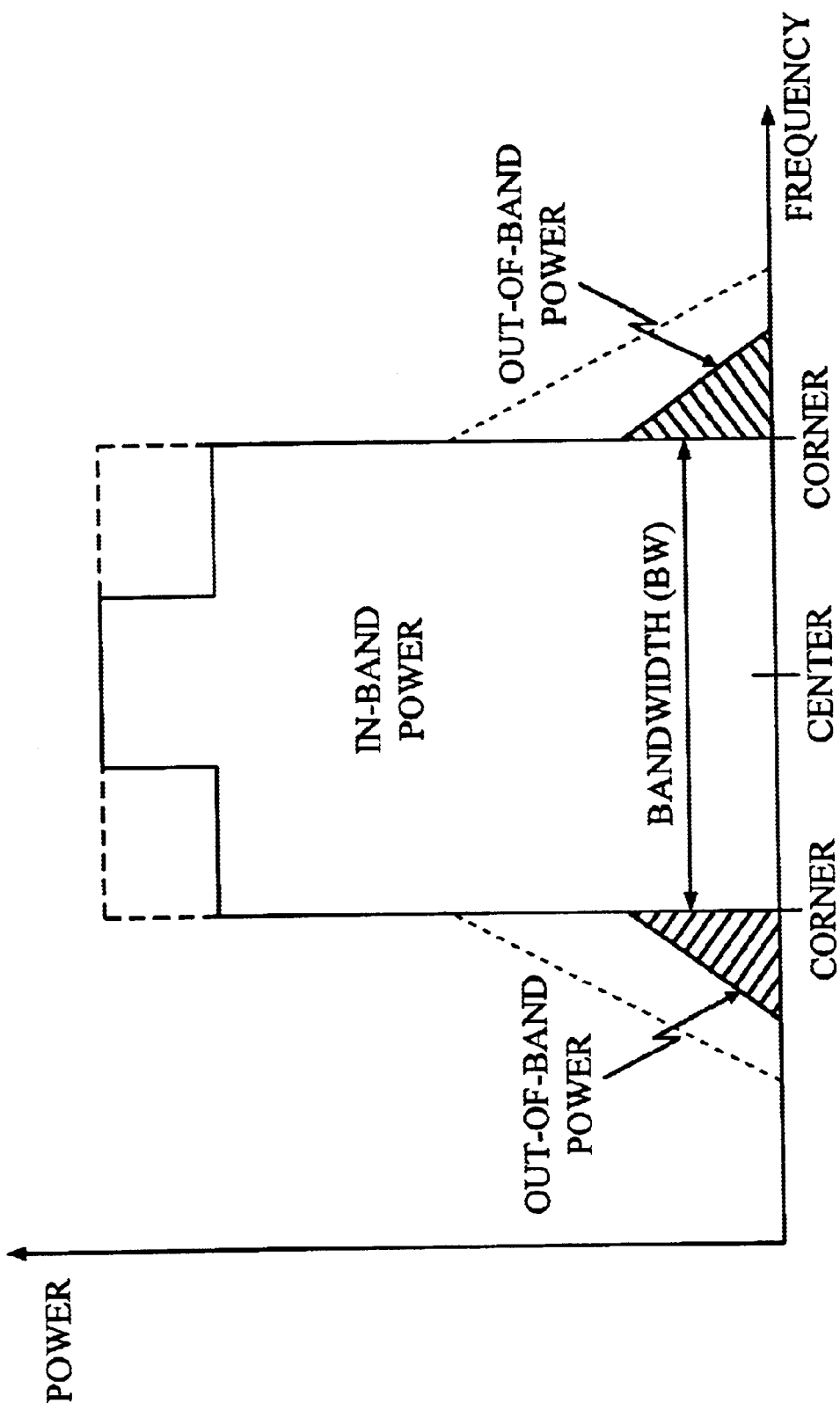
FIG. 15 is a graph illustrating the frequency spectrum of a CDMA signal with spectral shaping.
Figure 16:
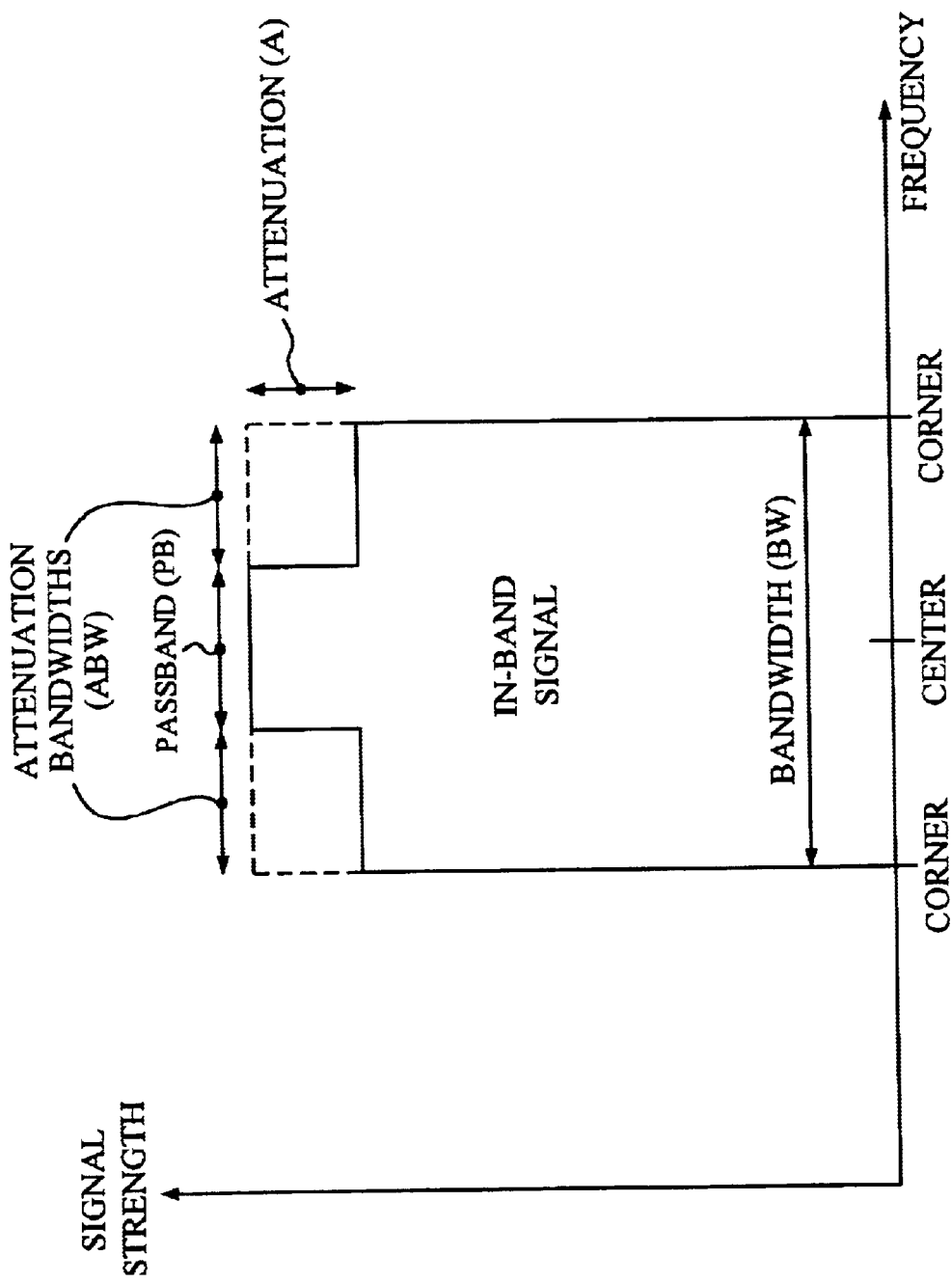
FIG. 16 is a graph illustrating the characteristics of the spectral shaping logic.

Spectral Shaping—FIGS. 15–16

A power amplifier is typically used to amplify CDMA signals. The output of the power amplifier in the time domain can be mathematically modeled as:

$$y(t) = \sum_{n=0}^{N} K_n[x(t)]^n = K_0 + K_1 x(t) + K_2 x^2(t) + K_3 x^3(t)$$

where x(t) is the input to the power amplifier. If this model is transformed from the time domain to the frequency domain, the mathematical representation is:

$$Y(f) = K_0 + K_1 X(f) + K_2(X(f)*X(f)) + K_3(X(f)*X(f)*X(f))$$

where Y(f) is the Fourier transform of y(t) and the symbol "*" denotes convolution. In the context of the invention, the even terms do not contribute significant power to the in-band signal.

Application of the well-known graphical technique for computing the convolution of X(f)*X(f)*X(f) reveals that in-band signal power that is input near the corner frequencies makes a disproportionate contribution to the unwanted out-of-band signal power that is output from the power amplifier. A reduction of in-band signal power that is input near the corner frequencies causes a disproportionate reduction in the unwanted out-of-band signal power that is output by the power amplifier. The reduction of in-band signal power does degrade the CDMA signal, but the degradation is acceptable given the disproportionate reduction in the out-of-band signal power.

Figure 1:
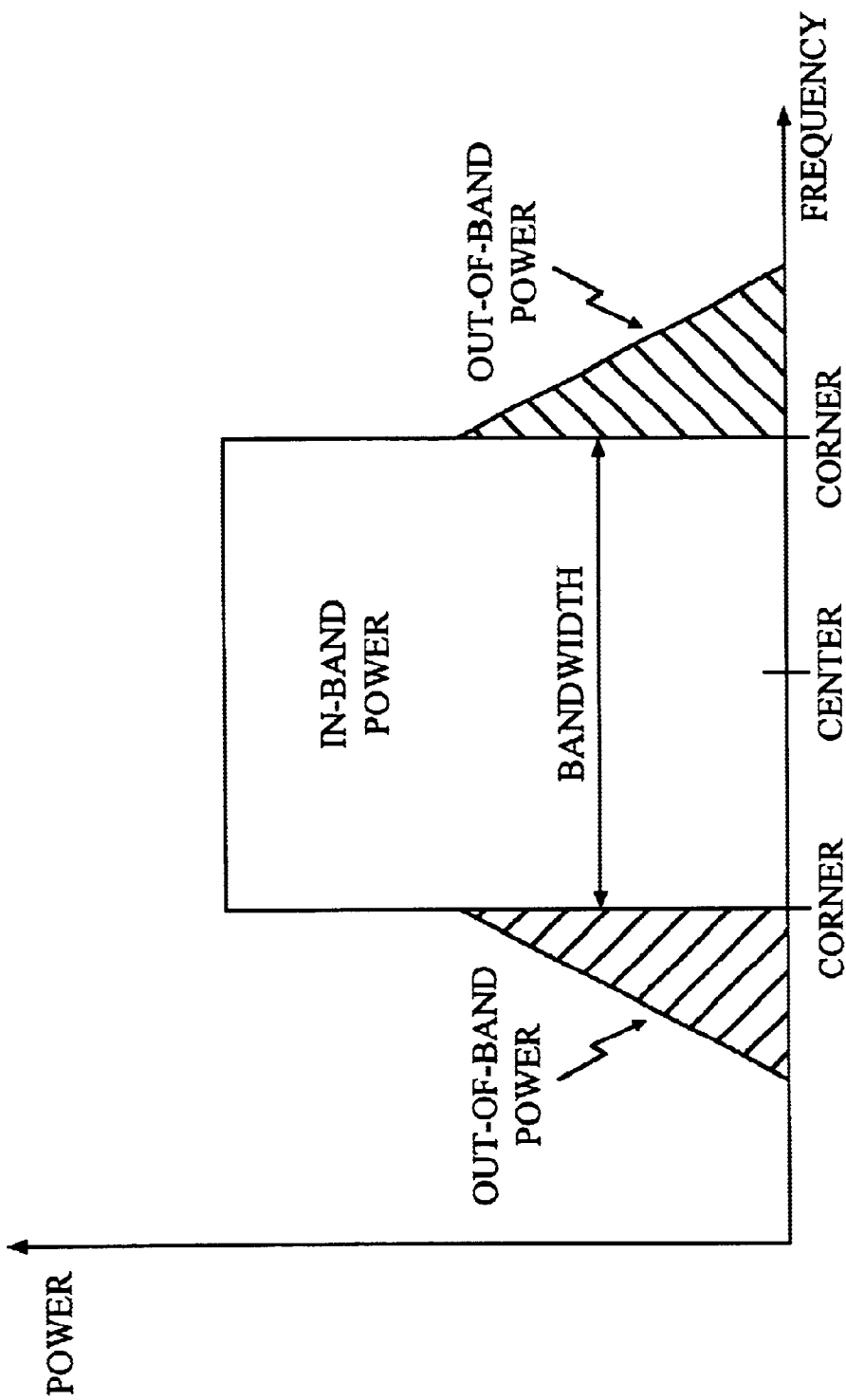
FIG. 1 is a graph illustrating the frequency spectrum of a CDMA signal.

FIG. 15 illustrates the frequency spectrum of a CDMA signal that has been amplified after being shaped by spectral shaping 727. The vertical axis represents signal power, and the horizontal axis represents frequency. The desired in-band signal power is contained within the bandwidth defined by corner frequencies around a center frequency. The undesired out-of-band signal power is shaded on FIG. 15. The dashed lines on FIG. 15 represent the CDMA signal from FIG. 1 that was not shaped by spectral shaping 727. The dashed lines illustrate that attenuation of the in-band signal power near the corner frequencies produces a reduction in the undesired out-of-band signal power.

FIG. 16 depicts characteristics of the spectral shaping 727. Those skilled in the art recognize that FIG. 16 represents ideal characteristics, but will recognize how to configure spectral shaping 723 based on the ideal characteristics of FIG. 16. The vertical axis represents signal strength, and the horizontal axis represents frequency. The dashed lines represent the CDMA signal before spectral shaping.

Spectral shaping 727 could be comprised of a digital or analog band-pass filter with the following characteristics. The bandpass filter would attenuate the signal strength in the attenuation bandwidths (ABW) by attenuation (A), and pass the signal strength within the passband (PB). The attenuation bandwidths ABW are adjacent to the corner frequencies and in-band, so they are within the CDMA signal bandwidth (BW). In some embodiments, the attenuation bandwidths (ABW) could each be 4.5% of the signal bandwidth BW. Alternatively, the passband PB could be 91% of the signal bandwidth BW and centered on the center frequency. The attenuation A could be 3 decibels. Alternatively, the spectral shaping can be implemented via baseband filtering prior to up-conversion.

An alternative version of spectral shaping 727 is described with respect to FIG. 8. Instead of placing spectral shaping 727 inside of transmit logic 723, spectral shaping 727 is placed in the D/A converter and filter 831 in between the D/A converter and the filter components. Spectral shaping 727 would then be comprised of analog filters that attenuate the strength of the in-band quadrature signals I and Q near the corner frequencies as depicted in FIG. 16. Spectral shaping 727 would then provide the shaped I and Q signals to the filter components of the D/A converter and filter 631. It may be desirable in this version of the invention to integrate spectral shaping 727 and these filter components into a single analog filter component combining the characteristics of the two.

Figure 17:
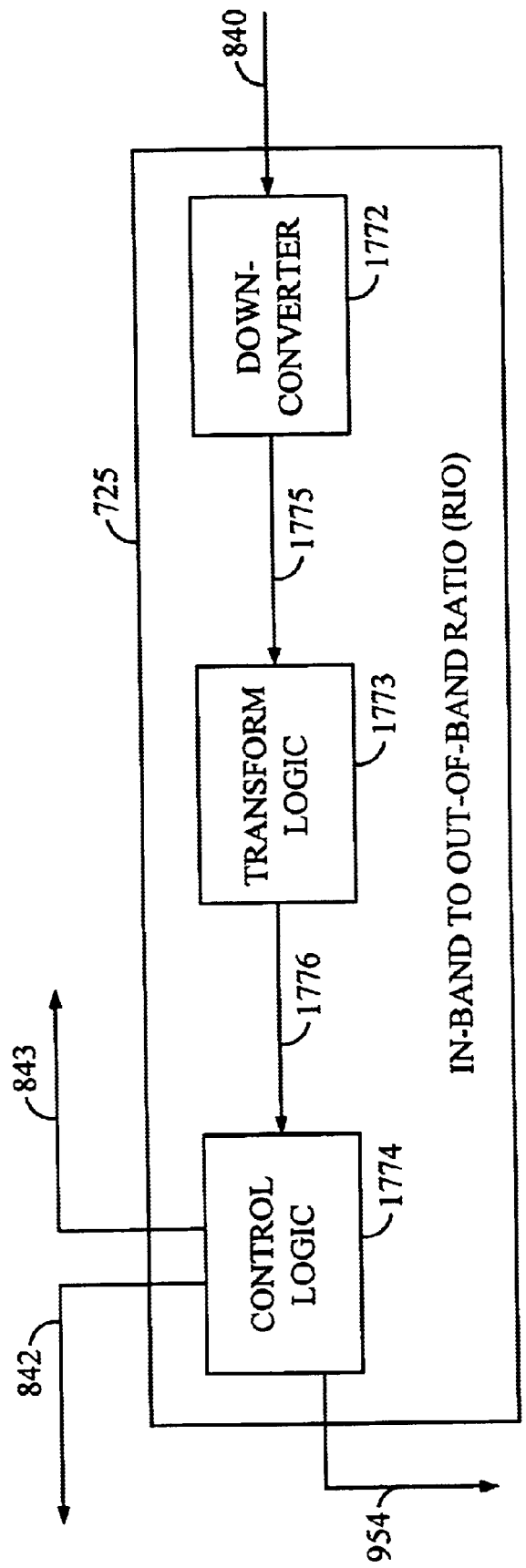
FIG. 17 is a block diagram of in-band to out-of-band signal ratio (RIO) logic.
Figure 18:
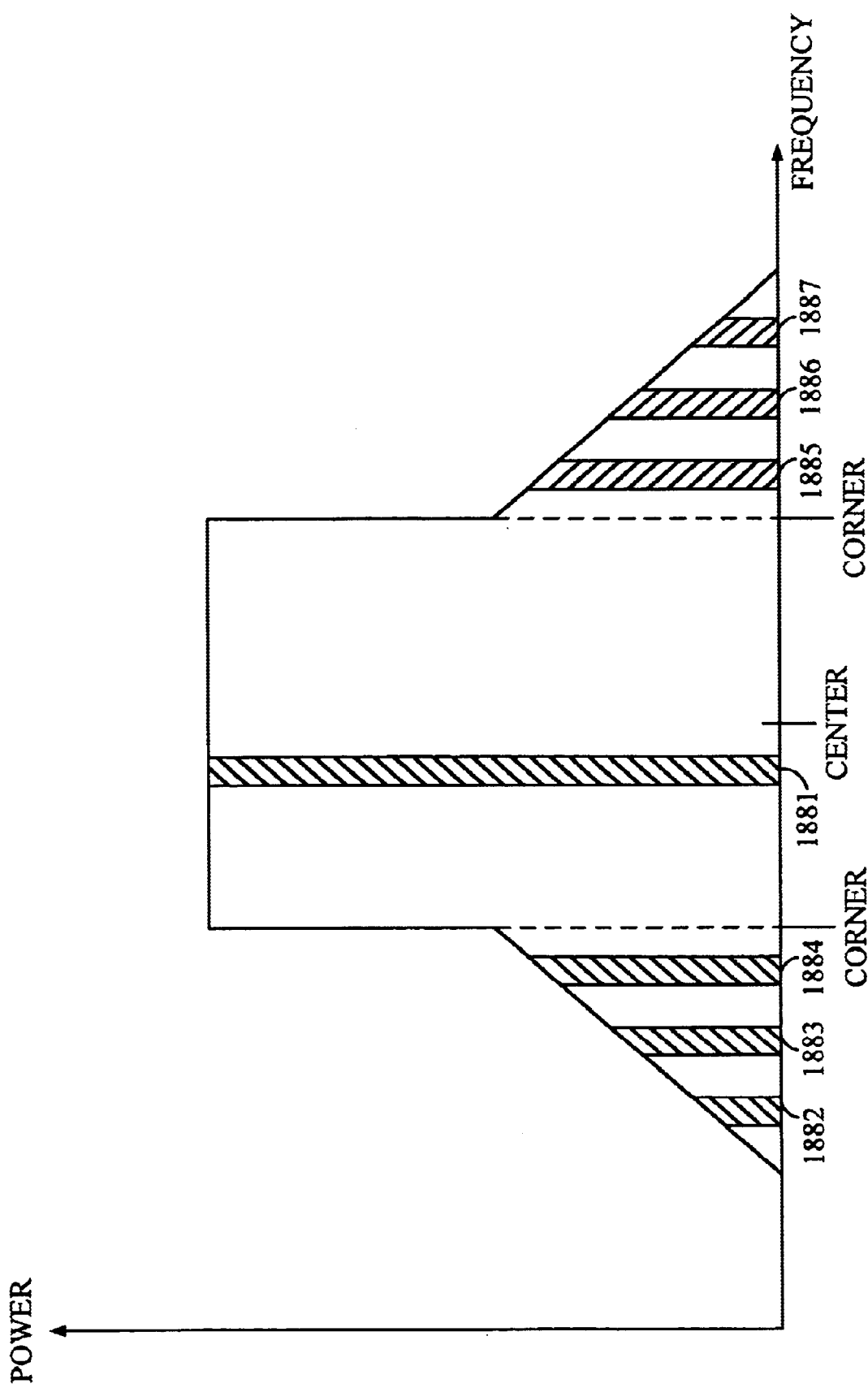
FIG. 18 is a is a graph illustrating the frequency spectrum of portions of a CDMA signal used for RIO control.

RIO Control—FIGS. 17–19

FIG. 17 depicts RIO 725. RIO 725 is comprised of down-converter 1772, transform logic 1773, and control logic 1774. The down-converter 1772 receives the signal 840 which is a copy of the transmitted CDMA signal. The down-converter 1772 de-modulates the RF signal 840 to form a baseband CDMA signal 1775. The down-converter 1772 provides the baseband CDMA signal 1775 to the transform logic 1773.

FIG. 18 illustrates the frequency spectrum of the baseband CDMA signal 1775 received by the transform logic 1773. Those skilled in the art recognize that FIG. 18 is an ideal representation of the signal. The vertical axis represents signal power, and the horizontal axis represents frequency. The desired in-band signal power is contained within the bandwidth defined by corner frequencies around a center frequency. Bandwidth segments 1881–1887 are shown. Bandwidth segment 1881 is in-band, and bandwidth segments 1882–1887 are out-of-band. The power in each bandwidth segment 1881–1887 is shaded on FIG. 18. The segments depicted on FIG. 18 are shown for illustrative purposes, and the actual segments used could vary in number or bandwidth. The segments could also be determined based on industry standards The transform logic 1773 performs Fast-Fourier transforms to generate values representing the power in each bandwidth segment 1881–1887. Those skilled in the art are familiar with the logic required to perform such Fast-Fourier transforms. The transform logic 1773 then generates ratio values that will depend on the segments used. In this example, the following ratio values are generated:

ratio 1—bandwidth segment 1881 power/bandwidth segment 1882 power;
ratio 2—bandwidth segment 1881 power/bandwidth segment 1883 power;
ratio 3—bandwidth segment 1881 power/bandwidth segment 1884 power;
ratio 4—bandwidth segment 1881 power/bandwidth segment 1885 power;
ratio 5—bandwidth segment 1881 power/bandwidth segment 1886 power;
ratio 6—bandwidth segment 1881 power/bandwidth segment 1887 power.

The transform logic 1773 generates a ratio signal 1776 that indicates the ratio values and transfers the ratio signal 1776 to the control logic 1774. The control logic 1774 compares each of the ratio values to an associated predetermined maximum value for the particular ratio. The control logic 1774 determines if any of the calculated ratios exceed their respective maximum values.

FIG. 19 depicts a logical table containing the ratio values 1–6, the respective maximum values, an indication if the ratios exceed the maximum values, and the difference between the ratios and the maximum values. Those skilled in the art are aware that the table is a logical representation that is capable of numerous implementations using conventional technology. The letters A–G that are listed in the table for the power ratio entries represent actual power measurements. The letters H–M that are listed in the table for the maximum value entries represent actual maximum values that can be readily obtained in standard industry publications, such as IS-97 by the Telecommunication Industry Association. The Federal Communications Commission also publishes maximum ratio values.

The control logic 1774 generates the power metric signal 843 and transfers it to the gain control 833. The power metric signal 843 sets a flag in the gain control 833 if one of the ratios exceeds its maximum value. The flag causes the gain control 833 to limit the transmit power of the base station 722. The power metric signal 843 clears the flag when none of the ratios exceed their maximum values. In this fashion, the transmit power of the base station 722 is optimized to the point set by the maximum ratio values.

The control logic 1774 generates a capacity metric signal 842 and transfers it to a base station control system (not shown). The capacity metric signal 842 indicates an estimate of the excess forward link capacity of the base station 722. To generate the estimate, the control logic 1774 determines the average difference between the measured ratios and the maximum values and translates the difference into a number of additional simultaneous calls that the base station 722 can handle without one of the calculated ratios exceeding its associated predetermined value. The base station control system can determine whether or not to block call hand-offs or new calls based on the capacity metric signal 842. In this fashion, the number of simultaneous calls handled by the base station 722 is optimized to the point set by the maximum ratio values.

The control logic 1774 also generates threshold metric signal 953 and transfers it to decresting 724. The threshold metric signal sets the threshold used by decresting 724. The use of the ratio to control power amplifier pre-distortion is described in "Predistortion Technique For High Power Amplifiers", filed on Jun. 26, 1998, and hereby incorporated by reference into this application.

Figure 20:
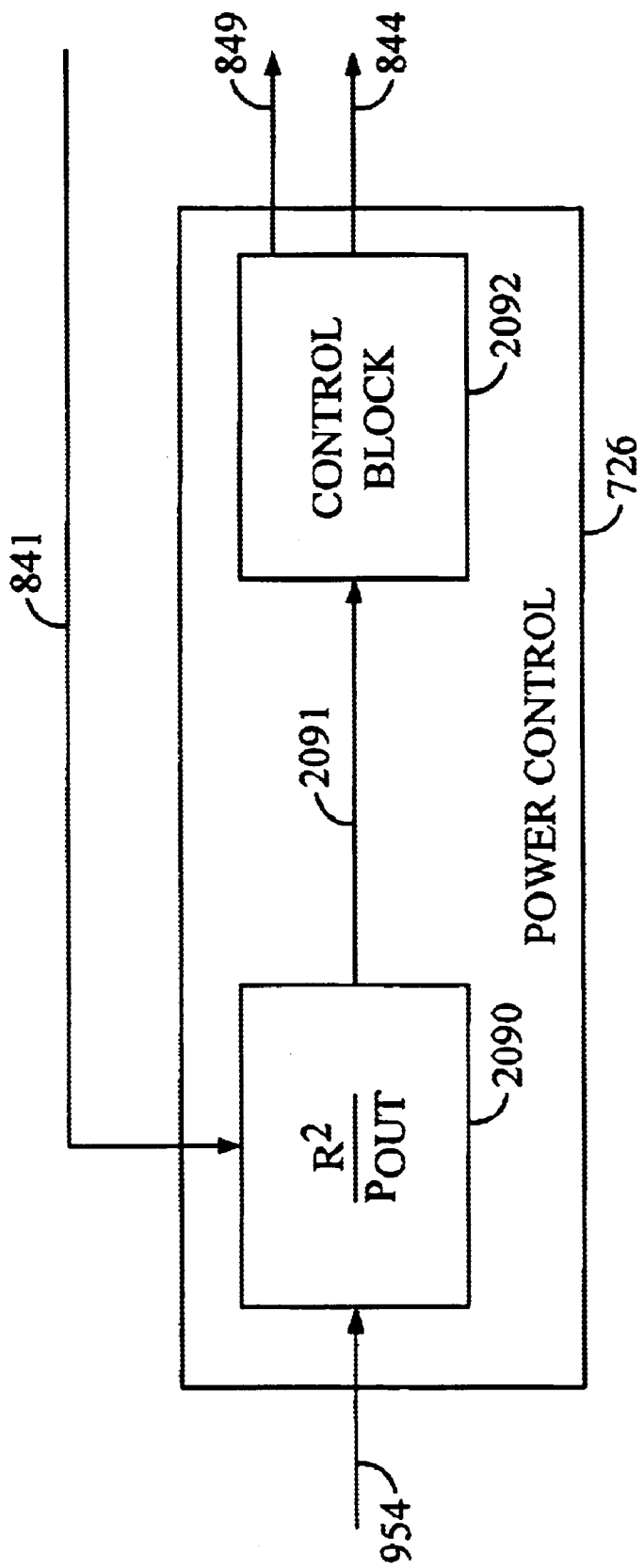
FIG. 20 is a block diagram of power control logic.
Figure 21:
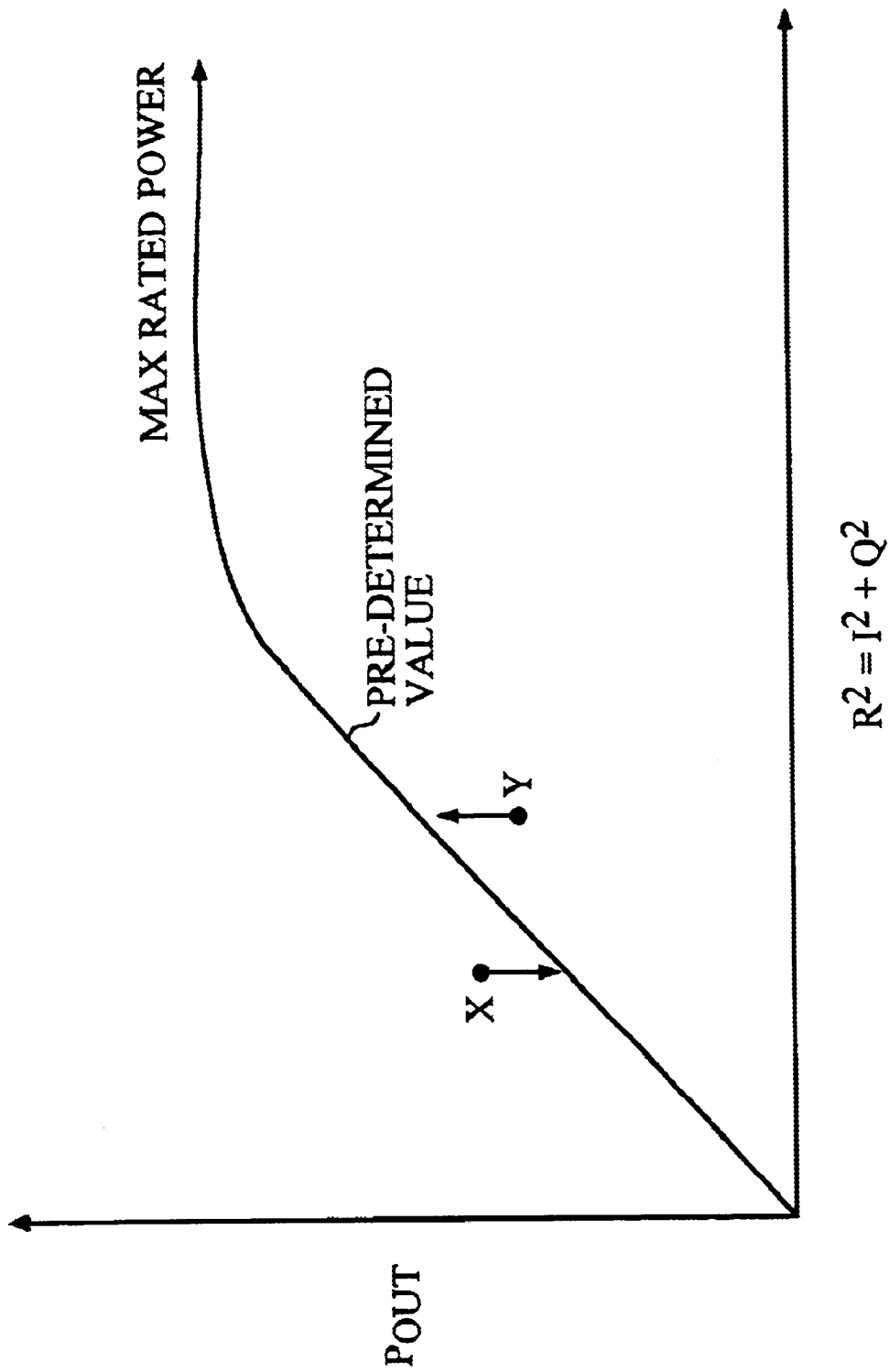
FIG. 21 is a graph illustrating quadrature signal power calculation and control.

Power Control—FIGS. 20–21

FIG. 20 depicts the power control 726. Power control 726 includes: ratio block 2090 and control block 2092. The ratio block 2090 receives signal 954 from decresting 724. The signal 954 provides the value $R^2=I^2+Q^2$. The ratio block 2090 also receives the signal 841 from the power monitor 835. The signal 841 provides the value Pout which is the transmit power of the CDMA signal 719. The ratio block 2090 determines a ratio that equals $R^2/\text{Pout}$. The ratio block 2090 provides the ratio in a signal 2091 to the control block 2092.

The control block 2092 compares the ratio to a predetermined value. Those skilled in the art are familiar with how to determine this pre-determined value by considering such factors as cell size, maximum rated power, minimum pilot signal strength at receiver, saturation, quantization errors, Ec/Io required at mobile device, and dynamic range of signal path. The control block 2092 generates the power control signal 844 to cause the gain control 833 to adjust the gain of the CDMA signal. The control block 2092 configures the power control signal 844 so the ratio moves closer to the pre-determined value. The control block 2092 also generates the capacity control signal 849 to indicate an estimate of the excess forward link capacity of the base station 722. The estimate is typically given in a number of additional simultaneous calls that can be handled by the base station 722. The control block 2092 transfers the capacity control signal 849 to a base station control system (not shown).

FIG. 21 shows the desired relationship between Pout and the $I^2+Q^2$ value. The points X and Y represent operational measurements, and the arrows represent the control applied through the control signal 844 to the gain control 833 to move the ratio closer to the pre-determined value. Those skilled in the art are aware that the slope of the pre-determined value blossoms during start-up and wilts during shut-down. Based on this document, those skilled in the art will appreciate how to assemble the power control 726 using conventional circuitry and software.

The previous description of the preferred embodiments is provided to enable any person skilled in the art to make or use the present invention. The various modifications to these embodiments will be readily apparent to those skilled in the art, and the generic principles defined herein may be applied to other embodiments without the use of the inventive faculty. Thus, the present invention is not intended to be limited to the embodiments shown herein but is to be accorded the widest scope consistent with the principles and novel features disclosed herein.

We claim:

1. A device for processing a Code Division Multiple Access (CDMA) signal, the device comprising:
   decresting logic operational to reduce peaks exceeding a threshold in the CDMA signal; and
   spectral shaping logic operational to attenuate in-band signal power near corner frequencies of the CDMA signal, wherein said in-band signal power is contained within bandwidth defined by said corner frequencies around a center frequency.

2. The device of claim 1 wherein the decresting logic is further operational to generate a digital correction signal in response to the peaks and to combine the digital correction signal with a digital version of the CDMA signal.

3. The device of claim 2 wherein the decresting logic is further operational to generate the correction signal by processing polar coordinate representations of quadrature components of the CDMA signal.

4. The device of claim 1 wherein the spectral shaping logic is further operational to attenuate the in-band frequencies adjacent to a first corner frequency and adjacent to a second corner frequency, wherein the corner frequencies define a bandwidth for the CDMA signal.

5. The device of claim 1 further comprising ratio logic operational to automatically generate a ratio of strength of at least a portion of in-band components in the CDMA signal to at least a portion of out-of-band components in the CDMA signal.

6. The device of claim 5 wherein the ratio logic is further operational to generate a metric signal to limit transmit power based on the ratio.

7. The device of claim 5 wherein the ratio logic is further operational to generate a metric signal indicating excess forward link capacity based on the ratio.

8. The device of claim 5 wherein the ratio logic is further operational to set the threshold based on the ratio.

9. The device of claim 5 further comprising power control logic operational to compare a power value calculated from quadrature components of the CDMA signal to a transmit power of the CDMA signal, and to automatically adjust a gain of the CDMA signal based on the comparison.

10. The device of claim 9 wherein the decresting logic is further operational to calculate the power value.

11. The device of claim 9 further comprising a power monitor operational to monitor the transmit power of the CDMA signal.

12. The device of claim 9 further comprising a cell site modem operational to generate the CDMA signal.

13. The device of claim 9 further comprising a digital-to-analog converter operational to convert the CDMA signal from digital to analog.

14. The device of claim 9 further comprising a low-pass filter operational to attenuate out-of-band noise in the CDMA signal.

15. The device of claim 9 further comprising an up-converter operational to modulate the CDMA signal to a radio frequency.

16. The device of claim 9 further comprising a power amplifier operational to amplify the CDMA signal.

17. The device of claim 9 further comprising an antenna operational to transmit the CDMA signal.

18. A device for processing a Code Division Multiple Access (CDMA) signal, the device comprising:

decresting logic operational to reduce peaks exceeding a threshold in the CDMA signal; and ratio logic operational to automatically generate a ratio of strength of at least a portion of in-band components in the CDMA signal to at least a portion of out-of-band components in the CDMA signal, wherein said threshold corresponds to said ratio.

19. The device of claim 18 wherein the decresting logic is further operational to generate a digital correction signal in response to the peaks and to combine the digital correction signal with a digital version of the CDMA signal.

20. The device of claim 19 wherein the decresting logic is further operational to generate the correction signal by processing polar,coordinate representations of quadrature components of the CDMA signal.

21. The device of claim 18 wherein the ratio logic is further operational to generate a metric signal to limit transmit power based on the ratio.

22. The device of claim 18 wherein the ratio logic is further operational to generate a metric signal indicating excess forward link capacity based on the ratio.

23. The device of claim 18 wherein the ratio logic is further operational to set the threshold based on the ratio.

24. The device of claim 18 further comprising a cell site modem operational to generate the CDMA signal.

25. The device of claim 18 further comprising a digital-to-analog converter operational to convert the CDMA signal from digital to analog.

26. The device of claim 18 further comprising a low-pass filter operational to attenuate out-of-band noise in the CDMA signal.

27. The device of claim 18 further comprising an up-converter operational to modulate the CDMA signal to a radio frequency.

28. The device of claim 18 further comprising a power amplifier operational to amplify the CDMA signal.

29. The device of claim 18 further comprising an antenna operational to transmit the CDMA signal.

30. A device for processing a Code Division Multiple Access (CDMA) signal, the device comprising:

decresting logic operational to provide quadrature components of the CDMA signal and reduce peaks exceeding a threshold in the CDMA signal; and power control logic operational to compare a power value calculated from said quadrature components to a transmit power of the CDMA signal, and to automatically adjust a gain of the CDMA signal based on the comparison.

31. The device of claim 30 wherein the decresting logic is further operational to generate a digital correction signal in response to the peaks and to combine the digital correction signal with a digital version of the CDMA signal.

32. The device of claim 31 wherein the decresting logic is further operational to generate the correction signal by processing polar coordinate representations of quadrature components of the CDMA signal.

33. The device of claim 30 further comprising spectral shaping logic operational to attenuate in-band frequencies of the CDMA signal.

34. The device of claim 33 wherein the spectral shaping logic is further operational to attenuate the in-band frequencies adjacent to a first corner frequency and adjacent to a second corner frequency, wherein the corner frequencies define a bandwidth for the CDMA signal.

35. The device of claim 30 wherein the decresting logic is further operational to calculate the power value.

36. The device of claim 30 further comprising a power monitor operational to monitor the transmit power of the CDMA signal.

37. The device of claim 30 further comprising a cell site modem operational to generate the CDMA signal.

38. The device of claim 30 further comprising a digital-to-analog converter operational to convert the CDMA signal from digital to analog.

39. The device of claim 30 further comprising a low-pass filter operational to attenuate out-of-band noise in the CDMA signal.

40. The device of claim 30 further comprising an up-converter operational to modulate the CDMA signal to a radio frequency.

41. The device of claim 30 further comprising a power amplifier operational to amplify the CDMA signal.

42. The device of claim 30 further comprising an antenna operational to transmit the CDMA signal.

* * * * *